United States Patent
Vargo et al.

(10) Patent No.: US 6,790,526 B2
(45) Date of Patent: Sep. 14, 2004

(54) OXYHALOPOLYMER PROTECTIVE MULTIFUNCTIONAL APPLIQUÉS AND PAINT REPLACEMENT FILMS

(75) Inventors: Terrence G. Vargo, Lewiston, NY (US); Timothy S. Koloski, Amherst, NY (US); John M. Brupbacher, Baltimore, MD (US); Andrew W. Dalgleish, Lancaster, NY (US); Garner S. Holdsworth, Amherst, NY (US)

(73) Assignee: Integument Technologies, Inc., Tonawanda, NY (US)

( * ) Notice: Subject to any disclaimer, the term of this patent is extended or adjusted under 35 U.S.C. 154(b) by 0 days.

(21) Appl. No.: 10/211,739

(22) Filed: Aug. 2, 2002

(65) Prior Publication Data

US 2003/0152766 A1 Aug. 14, 2003

Related U.S. Application Data

(63) Continuation-in-part of application No. 09/239,108, filed on Jan. 27, 1999, now Pat. No. 6,428,887.
(60) Provisional application No. 60/073,114, filed on Jan. 30, 1998.

(51) Int. Cl.[7] .................................................. B32B 9/00
(52) U.S. Cl. ........................ 428/343; 428/421; 428/422; 428/423.1; 428/413; 428/355 EP; 428/418; 428/457; 428/480; 428/500; 428/523
(58) Field of Search ............................. 428/422, 423.1, 428/355 EP, 457, 480, 500, 523, 343, 421, 413, 418

(56) References Cited

U.S. PATENT DOCUMENTS

| | | |
|---|---|---|
| 4,946,903 A | 8/1990 | Gardella, Jr. et al. .... 525/326.4 |
| 5,266,309 A | 11/1993 | Gardella, Jr. et al. .... 424/78.09 |
| 5,627,079 A | 5/1997 | Gardella, Jr. et al. ....... 436/525 |
| 5,703,173 A | 12/1997 | Koloski et al. .......... 525/326.2 |
| 6,177,189 B1 | 1/2001 | Rawlings et al. ........... 428/343 |

OTHER PUBLICATIONS

Licari et al., Handbook of Polymer Coatings for Electronics: Chemistry, Technology and Applications, Second Edition, 1990, pp. 30–31.*

* cited by examiner

*Primary Examiner*—David J. Buttner
*Assistant Examiner*—Christopher Keehan
(74) *Attorney, Agent, or Firm*—Howard M. Ellis

(57) ABSTRACT

Novel appliqués comprising oxyhalopolymer-adhesive composites wherein the adhesive layer of the composite is chemically bonded to reactive sites on at least one side of the oxyhalopolymer layer, possess superior peel strengths, resistance to delamination and protective properties, including protection of surfaces from lightning strike to seamless protective liners for tanks. The appliques are suitable for printing architectural designs thereon. Multilayered specialty appliqués can be fabricated from the above fundamental oxyhalopolymer-adhesive composite structure, including layered adhesives for encapsulating tridimensional mechanical and electrical devices, such as RF, or microwave sensitive antennae for transmitting and receiving communications, providing protection from environmental electromagnetic effects ($E^3$), shock and impact resistance, multidimensional deformable structures; housing for temperature control systems, etc. The properties of the appliqués can be modified by introducing various additives to the halopolymer and/or adhesive layers to customize electrical, and optical shielding, or reflectivity, corrosion resistance, and the like.

58 Claims, 4 Drawing Sheets

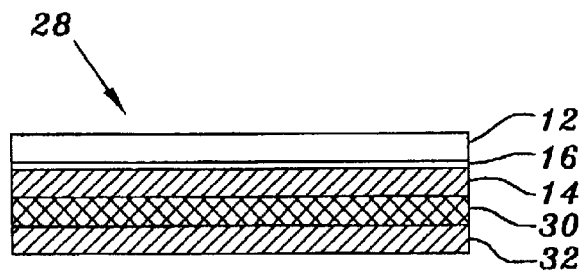
FIG. 4
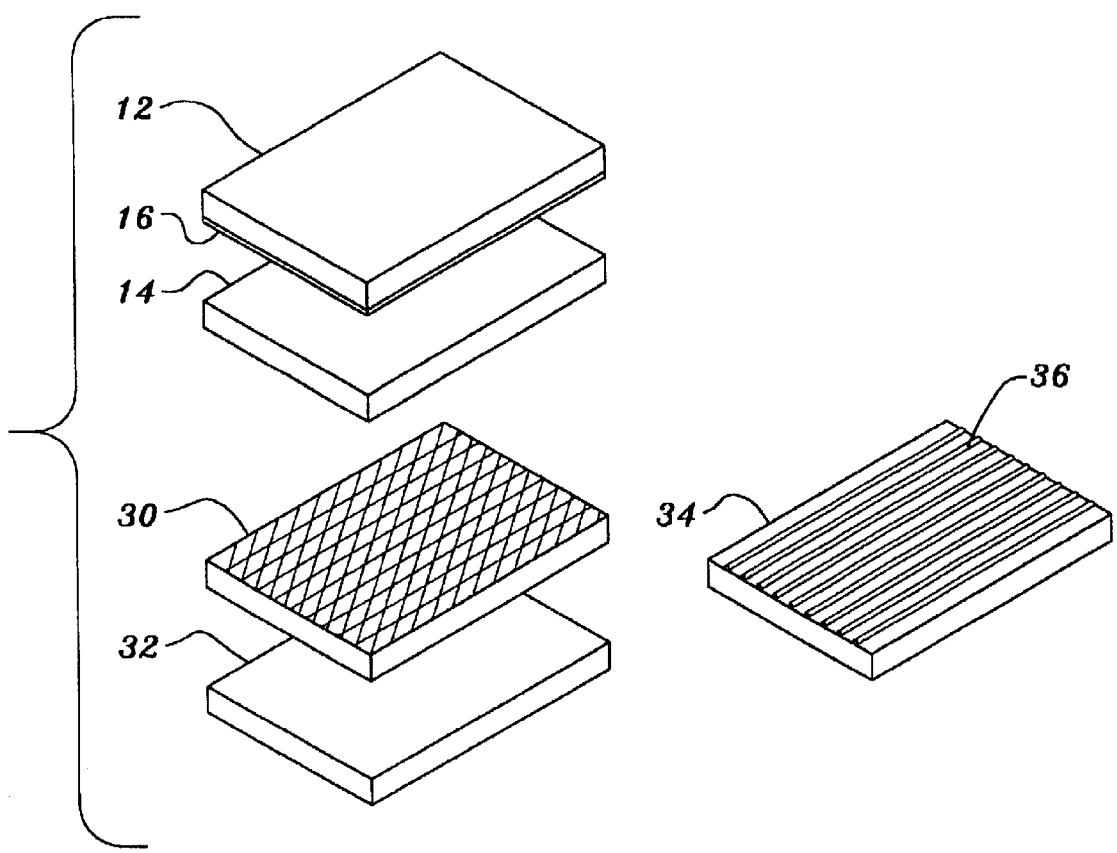
FIG. 5A
FIG. 5B

OXYHALOPOLYMER PROTECTIVE MULTIFUNCTIONAL APPLIQUÉS AND PAINT REPLACEMENT FILMS

CROSS REFERENCE TO RELATED APPLICATION

This application is a continuation-in-part of application Ser. No. 09/239,108, filed Jan. 27, 1999, now U.S. Pat. No. 6,428,887, which claims the benefit of Provisional Application Ser. No. 60/073,114 filed Jan. 30, 1998.

TECHNICAL FIELD

The present invention relates generally to halopolymer materials with adhesive surfaces, and more specifically, to protective appliqués as paint replacements for a wide range of substrates. The appliqués are layered structures, or polymeric films, generally halopolymers which have been modified by the introduction of surface hydrogen and oxygen or oxygen-containing functionalities. These reactive sites are suitable for chemically bonding with adhesive materials to form composite structures possessing superior peel strengths, resistance to delamination and protective properties when applied to surfaces, as replacements for the usual protective paint systems widely used in the aerospace, land and marine fields in general, and including the chemical, food processing and transportation industries. More particularly, the appliqués find numerous applications for aircraft and spacecraft parts and assemblies, partial and complete fuselage panels, wings for enhancing laminar flow, reducing ice formation and friction, entire aircraft hulls, aircraft markings and decals; replacements for paints, including architectural or as decorative appliqués suitable for printing, with emblems for use as transfer films and decals for rail cars, highway vehicles, including tractor-trailer rigs; protective films for marine vessels, and so on. The adhesive backed appliqués also have numerous utilities for internal surfaces, such as protective liners for containment vessels in the chemical and food processing industries, to name but a few.

BACKGROUND OF THE INVENTION

Halopolymers are a group of polymers with carbon chains wherein all or a percentage of the carbons have covalently bonded halogen atoms. Halopolymers are characterized by extreme inertness, high thermal stability, hydrophobicity, low dielectric properties and low coefficients of friction. Representative examples of halopolymers that exhibit these characteristics include fluoropolymers and fluorochloropolymers, such as fluorohydrocarbon polymers, e.g., polyvinylidene fluoride (PVDF), polyvinyl fluoride (PVF), polychlorotrifluoroethylene (PCTFE), including the well known fluorocarbon polymers, e.g., perfluorinated polymers, like polytetrafluoroethylene (PTFE), expanded polytetrafluoroethylene (ePTFE), FEP, perfluoroalkoxy polymer like PFA and MFA and copolymers and terpolymers thereof, for example, a terpolymer derived from TFE, hexafluoropropylene and vinylidene fluoride (THV), etc. However, because halopolymers are so inert and have low coefficients of friction, they will not reliably bond to other surfaces, or bond to value-added molecules. As such, the sought after characteristics of a halopolymer, such as inertness and hydrophobicity are not easily transferred to another substrate because of the difficulty in adhering a halopolymer film to the substrate.

Several attempts have been made to modify halopolymers to provide more bondable surfaces. For instance, U.S. Pat. No. 4,933,060 discloses a reactive gas plasma process wherein a glow discharge in an oxygen containing atmosphere leads to the formation of oxygen-containing functionalities on the surface. However, this method merely etches the surface creating transient oxygen-containing functionality, and the activity of the bonding sites is short-lived rendering an etched material with a limited shelf-life. Furthermore, the polymeric chains containing the oxidized surface functionalities undergo unavoidable reorientation due to their low molecular weights and subsequent migration, as described by H. Yasuda et. al. in *J. Polym. Sci.: Polym. Phys. Ed.*, 19, 1285 (1981). As a result, surfaces of an etched halopolymer have limited periods of reactivity, and must be applied to an adhesive before reorientation of the etched surface. Moreover, bonds formed between the adhesive and etched halopolymer material lack permanency and tend to degrade under UV radiation, humidity and thermal stress conditions, due to rearrangement of the polymer. British Pat. Pub. 998,807 provides for a method of increasing adhesiveness of halopolymers using corona discharge plasma in an inert atmosphere which is essentially oxygen-free. However, the processed material must be maintained in an oxygen-free atmosphere to retain activity. Once the surface is exposed to moisture or oxygen the treated surface becomes deactivated limiting useful shelf-life. Furthermore, corona discharge plasmas are non-uniform plasmas generated from a point source, so the processed material is not uniformly modified or activated. The lack of uniformity of the surface disrupts continuity in batch production of the modified film.

A further method of modifying halopolymer materials to increase adhesiveness includes etching the halopolymer material by reacting with an alkali metal and naphthalene. However, this method provides a low level of defluorination. Consequently, the material readily degrades under thermal and ultraviolet stress conditions. Furthermore, the surface is chemically roughened (i.e., etched) which, in addition to an inconsistent degree of modification, provides nothing more than a non-permanent mechanical bond.

Fluoropolymers have also been suggested for use in the fabrication of paint replacement films, especially as corrosion protective surface coatings, for instance, in the form of appliqués. They have been of interest in both commercial avaition and for aerospace applications. Durable paint replacement films offer potential benefits of lower aircraft production costs, reduced maintenance requirements, weight reduction, environmental benefits, to name but a few.

One example of exterior protective appliqués intended as replacements for aviation paint systems for reduced lifecycle costs, improved performance and protection of surfaces from corrosion is disclosed by U.S. Pat. No. 6,177,189, to Rawlings et al. A paintless coating system is disclosed for replacing conventional paints on metal or composite aerospace parts and assemblies consisting of an appliqué having a topcoat or external film, a vapor barrier interfacing with and completely underlying the topcoat, and an adhesive on at least one face of the vapor barrier for adhering the appliqué to a surface of the part or assembly. More specifically, the topcoat consists of an organic resin matrix elastomeric composite, particularly a rain and thermal resistant fluoroelastomer. The intermediate vapor barrier which functions to eliminate active transport of water vapor or other corrosive agents to the substrate being coated, consists of a terpolymer derived from TFE, hexafluoropropylene and vinylidene fluoride. The preferred adhesive is a pressure sensitive acrylic. According to Rawlings et al the adhesive should hold the appliqués on the surface during normal operation, but should also be peelable without leaving a residue on the substrate for easier replacement.

While Rawlings et al reported that testing of their appliqués provided protection at 500 mph, comparable to special rain coatings in some conditions, they also observed delamination occurring in several test specimens between the topcoat film layer and the vapor barrier.

Accordingly, it would be highly desirable to have improved adherent protective halopolymeric surface coatings or appliqués as a paintless system of protective films for a wide range of end use applications for both interior and exterior surfaces, especially including aerospace, land and marine applications which not only provide the needed protective barrier against corrosion, but are also more fail safe in resisting delamination between the layers of the composite under the most severe operating conditions.

SUMMARY OF THE INVENTION

It is therefore an object of the present invention to provide surface modified halopolymers which repel water and other polar solvents, as well as non-polar solvents, possess high thermal stability, low friction coefficients and chemically bond to adhesive substances to form permanent bonds with superior strength.

It is a further object of this invention to provide adhesive-oxyhalopolymer composites comprising a modified halopolymer material having substituted functional groups that chemically bond to an adhesive material forming a bond that does not significantly degrade due to chemical attack, ultraviolet radiation, humidity, temperature extremes, salt, acid or caustic agents, steam and/or reorientation of substituted functional bonding sites.

Yet another object is to provide adhesive-oxyhalopolymer composites that can withstand attack by chemicals, ultraviolet radiation, humidity, temperature extremes, salt, acid or caustic agents and steam.

A further object of the invention is to provide a surface modified halopolymer film having two sides of which the first side is chemically bonded to an adhesive wherein during the wrapping or overlapping of the film, the adhesive coated first side can bond to the second side. One or both sides of the halopolymer film may be modified.

A still further object is to provide an adhesive-oxyhalopolymer composite wherein the oxyhalopolymer is uniformly treated and reproducible to provide quality control in the adhesive end product.

Yet another object is to provide methods for preparing adhesive-oxyhalopolymer composites having a modified surface which is not roughened or damaged by plasma etching, but instead at least one surface is controllably modified by the introduction of hydrogen and oxygen or oxygen-containing groups onto the surface matrix of the oxyhalopolymer to impart permanent chemical reactivity to the surface.

In this regard, it has been discovered that when the surface of a halopolymer material is exposed to radio frequency glow discharge (RFGD) in the presence of a hydrogen gas-vapor mixture comprising water, methanol, or other oxygen containing liquids (e.g., formaldehyde), a modified surface forms which comprises a controllably reduced amount of the original halogens, usually fluorine atoms, which are replaced with controlled amounts of hydrogen and oxygen or oxygen-containing groups covalently bonded to the carbon backbone of the polymer. The surface modified halopolymer material, which is an oxyhalopolymer, retains the unique properties of the original halogenated material, i.e. low surface energy. However, the surface modified halopolymer or oxyhalopolymer is also reactive and chemically bonds with an adhesive substance forming a stable and permanent bond with surprising and unexpected superior strength.

It is yet a further object of the invention to provide a novel class of surface protective coatings, mainly films and appliqués for use as paint replacements for bonding to a broad range of substrates, both interior and exterior surfaces, metallic, non-metallic, including polymeric and ceramic surfaces. The paint replacement films are especially useful in the aerospace field for application to exterior surfaces of aircraft and spacecraft, in aviation, providing protection for fuselage panels, wings as a paintless system for enhancing laminar flow, reducing friction and ice formation, hulls, aircraft/spacecraft markings and decals. The adhesive backed film composites and appliqués are also useful as paint replacements for marine vessels and shipping; land vehicles, such as highway trailers, railcars, protective liners for tank cars; liners for containment vessels and reactors in the chemical and food processing industries, and so on.

In addition to the halopolymers and fluoropolymers previously mentioned, the paint replacement films may also be fabricated with copolymers, terpolymers and polymeric blends. The halopolymers may also comprise various outer layers and coatings, including additives, such as carbon, metallic or metal oxide particles, in the form of flakes, fibers and pigments, for example, including constituents which impart thermal, optical, magnetic, electromagnetic, electronic and/or mechanical properties thereto.

The oxyhalopolymer materials of the invention may be in the form of a film, sheet, powder, bead, fiber, mesh, mold, coating, tubing, porous veiled material or any other shape utilized for a specific application. The modified film with oxyhalopolymer surface is readily chemically bonded to an adhesive. As previously mentioned, the appliqué comprising adhesive-oxyhalopolymer film composites of the invention may be applied to virtually any substrate, including medical devices, electrically conductive and nonconductive, metal, non-metal, wood, ceramic, glass, plastic, etc., to impart the desired protective properties of the halopolymeric material to the new surface, and any devices encapsulated in the appliqués. These adhesive-oxyhalopolymer film composites are useful for innumerable household, medical and industrial applications and can be applied to a substrate in situ, to preserve, protect and extend the life of the object. Such objects may include the bases of telephone poles, fence posts, concrete foundations, drain gutters, entire aircraft/spacecraft hulls, airplane wings for corrosion protection and to reduce ice formation and friction, hulls of ships and docks to prevent marine biofouling, fume hoods, machine tools, walls of buildings as anti-graffiti coatings, bondable gaskets, chemical containment vessels and pipes for protecting the containment structure, coil coatings, metals, such as carbon steel or any other surfaces which may be damaged or corroded by exposure to weather conditions, moisture, oceanic conditions water vapor, humidity, mildew, temperature, salt, corrosive chemicals, radiation, and so on.

In forming the adhesive-oxyhalopolymer composites an outer surface of a halopolymer is modified by substituting hydrogen and oxygen or oxygen-containing groups for at least a portion of the halogens atoms on the halopolymer surface. Subsequently, the oxygen or oxygen-containing groups on the surface of the modified oxyhalopolymer-containing material are reacted, i.e., chemically bonded to an adhesive to form the composite films of the present invention. The bulk characteristics, such as chemical resistance, inertness, stability of polymeric structure and hydrophobicity of the original starting halopolymer material are retained below the outer surface of the modified oxyhalopolymer.

Generally, the adhesives which may be applied and reacted with the oxyhalopolymer layer to form the composites and protective films and appliqués of this invention are homopolymers and copolymers of acrylates, acetates and mixtures thereof. Other representative examples of useful types of adhesives are polymers of cyanoacrylates, epoxies, sulfides, vinyl esters, e.g., polyethylene-vinylacetates and copolymers thereof; silicone-containing adhesives, e.g., polysilicones, polysiloxanes; rubber type adhesives, including fluoroelastomers; the urethanes, including the etherurethanes, unsaturated polyesters, and copolymers or blends of the above cited materials Either contact, pressure sensitive, or thermoplastic based adhesives may be used. The adhesive systems of the invention may include certain additives, like corrosion inhibitors, crosslinking inhibitors, and various other materials, such as carbon, metals or metal oxide particles, flakes, fibers or others which can impart thermal, optical, magnetic, electromagnetic, electronic or mechanical properties, can be used.

The morphological properties of the oxyhalopolymer, at the molecular level, remain substantially unchanged from those of the starting halopolymer while wettability with respect to low surface tension liquids and surface free energy ($\gamma_s$) as determined through critical surface tension ($\gamma_c$) are increased. Instead of applying a modified polymer coating (i.e., a new film layer) to the surface of an original halopolymer material, the object is to provide for an oxyhalopolymer material in which the original starting bulk halopolymer is permanently modified at the molecular level by removal of some of the halogen atoms, so the carbon backbone has halogen, oxygen and hydrogen atoms covalently bonded thereto. In essence, the original halopolymer which is modified to form an oxyhalopolymer has a sufficient number of halogen atoms permanently substituted with both hydrogen atoms and oxygen or oxygen-containing groups like hydroxy functionality covalently bonded to the carbon backbone usually to a surface depth of about 10 to about 100 Å to increase the surface free energy ($\gamma_s$) while the hydrophobic properties are substantially unchanged and non-fouling properties are maintained.

Another embodiment of the present invention is to provide for adhesive-oxyhalopolymer composites which comprise a halopolymer material, such as a film having a first and second side with at least the first side's outer surface modified by substituting hydrogen and oxygen or oxygen-containing groups for at least a portion of the halogen atoms thereby providing an oxyhalopolymer film. The oxygen or oxygen-containing groups substituted on at least the first side of the oxyhalopolymer film are chemically bonded to an adhesive to form a composite structure. If only one side of the halopolymer film is modified, the surface of the modified side will bond to an adhesive while the other side will retain the surface properties of the original halopolymer film. If both sides of the halopolymer film are modified and only one side of the modified film is bonded to an adhesive, the other modified side retains its chemical reactivity almost indefinitely with little or no reorientation of the surface functionality groups. This also allows for extended shelf-life of the adhesive-oxyhalopolymer composites of the present invention. It also allows for a stable film which may be used sometime in the future when the film is wrapped or layered upon itself for protecting a surface because the modified side without the adhesive is still reactive, and therefore, can form covalent bonds with the adhesive coated side as soon as contacted therewith.

If both sides of the halopolymer are modified and subsequently bonded to an adhesive then the double-sided adhesive oxyhalopolymer film may be "sandwiched" between two other materials. This application forms an internal protective barrier by employing the halopolymeric properties between two materials, such as between layers of wood panels for laminating wood composites, between underlayment and floor tiles, plywood roof sheeting and asphalt tile or providing a bonding surface between two incompatible materials, and in preparing protective films, appliqués, and specifically when used as paint replacement films. The oxyfluoropolymer-adhesive laminate sandwiched within a multilayer composite structure is also useful in providing strength, and/or performing as a structural barrier to water, gas or other chemical substances within the composite structure, e.g., carbon or fiberglass composites. Additionally, an adhesive-oxyhalopolymer composite of the present invention may bond to itself allowing for overlap of an adhesive-oxyhalopolymer film onto itself during application to a surface. This provides for better sealing with virtually no degradation of the adhesive seal on the overlapping edges of the film.

In the adhesive-oxyhalopolymer composites, including the appliqués used as paintless replacement films of the present invention up to 98 percent, and more specifically, from about 20 to about 85 percent of the surface halogen atoms of the oxyhalopolymer material are permanently substituted with hydrogen and oxygen and/or oxygen-containing groups of which from about 3 to about 30 percent of the substituted halogen atoms are replaced with oxygen and/or oxygen-containing groups and from about 70 to about 97 percent of the substituted halogen atoms are replaced with hydrogen atoms. The exact amount of hydrogen, halogen and oxygen or oxygen containing functional groups depends on several variables, such as the type of polymer, the thickness of the same and resident time of exposure to the plasma gas/vapor mixtures used in the present invention. It has been discovered that there is an optimal time of exposure to the plasma gas/vapor mixtures for each type of polymer to provide the optimal level of controlled modification of the surface of the polymer, depending on the type of material to be bonded. It has also been discovered that there appears to be a differing degree of maximum bonding depending on the specific polymeric type (i.e., mechanical properties and inherent polymer characteristics).

The halogens are replaced to depths from about 10 to about 200 Å, and preferably from about 10 to 100 Å. However, the morphological properties and bulk properties of the oxyhalogenated surface remains substantially unchanged over the starting bulk halopolymer material.

Another embodiment of the present invention provides for appliqués comprising oxyhalopolymer-adhesive composites, which may function as paint replacement (paintless system) films comprising a halopolymer material, such as a film having both first and second sides, wherein one or both sides are modified by substituting hydrogen and oxygen and/or oxygen-containing groups for at least a portion of the surface halogen atoms thereon. The reactive oxygen or oxygen-containing sites on the first side of the halopolymer film may be chemically bonded to an adhesive for improved peel strength, and optionally, the oxygen or oxygen-containing sites introduced on the second side of the halopolymer film can be covalently bonded to metals, and especially a transition metal. Generally, the invention contemplates the addition of metals as films, foils, mesh and in circuitry format applied either directly to the outer oxyfluoropolymeric surface, or within the adhesive system for imparting a permeation barrier to gas, water or other chemicals, as well as for protection from various electromagnetic environmental effects, such as lightning, shielding EMI (electromagnetic interference), sensor transduction characteristics in detection of biological, chemical, nuclear contamination or corrosion onset. Generally, transition metals for this invention are intended to include metals from Groups IIIa, IVa, Va, VIa, VIIa, VIIIa, Ib, IIb, IIIb and IVb of the Periodic Table. The oxyhalopolymer-adhesive composite films having covalently bonded transition metals may also provide surfaces with catalytic activity. They may be utilized as biocidal coatings, shielding coatings, absorbing coatings to absorb sound or radiation, and as a surface barrier which may block the transfer of gas and water vapor. Further, they may be securely bonded to other substrates by applying the adhesive side of the modified halopolymer to the substrate. As previously mentioned, the adhesive film composites also provide protection from environmental effects, including corrosion. One of the objects of this invention therefore is to provide—specifically for a multifunctional oxyhalopolymer paint replacement films or appliqués which utilize an adhesive system which firstly, inhibits or eliminates entirely the corrosion of metals, and, secondly, promotes good adhesion of the oxyfluoropolymer to either a metallic or non-metallic surface or material.

Various classes of corrosion inhibitors are contemplated. Generally, they include amine based organics, inorganic phosphates, chromates, tins, zinc phosphates, phosphosilicates, and other phosphates of varying particle sizes. More specifically, the appliqué composites may be comprised of compositions, i.e., oxyhalopolymeric film and adhesive system modified by compounding with various corrosion inhibitors including certain aminophosphonic acids, aminophosphorous acids and/or their zirconium, bismuth and calcium salts, and salts thereof with certain amines.

Additionally, because some specialized adhesives form stronger bonds when applied to surfaces with metallic characteristics, the metallic characteristics of the second side of the adhesive oxyhalopolymer film may be used as a surface for chemically bonding an adhesive.

It is yet a further object of the present invention to provide for a method of making the previously described adhesive-oxyhalopolymer composite films and appliqués, the method which comprises providing a halopolymer material wherein at least a portion of halogen atoms are substituted with hydrogen and oxygen or oxygen-containing groups to form an oxyhalopolymer material and contacting the oxyhalopolymer material with an adhesive.

Specifically, adhesive-oxyhalopolymers film composites and appliqués of the invention may be prepared by the steps of:
  a) modifying at least one surface of a halopolymer material by treating the surface with a radio frequency glow discharge gas/vapor mixture under vacuum to permanently substitute at least a portion of the surface halogen atoms with hydrogen and oxygen or oxygen-containing groups at the molecular level to provide a material with at least one oxyhalopolymer surface; and
  b) contacting the oxyhalopolymer surface of step (a) with an adhesive.

Any adhesive may be used that bonds to the surface functionality groups of the modified halopolymer including but not limited to epoxy, fluorine based, aqueous based, solvent based, acrylic, polyester, heat sealable, pressure sensitive including rubber, acrylic, vinyl acetates and/or silicone, release coating and mixtures thereof. The gas/vapor mixtures may be selected from hydrogen, water, methanol or other oxygen containing liquids (i.e., formaldehyde), and preferably a hydrogen/methanol or hydrogen/water mixture.

The method imparts reactive sites that chemically bond to an adhesive. Plasma gas/vapor mixture concentrations of hydrogen, water, methanol, and other oxygen-containing liquids, such as formaldehyde together with wattage or power of the glow discharge and time of plasma treatment are variables which determine the depth of surface modifications at the molecular level, as well as the respective atomic concentrations of carbon, halogen, hydrogen and oxygen making up the oxyhalopolymer surface.

The invention further contemplates oxyhalopolymer-adhesive film composites for use as appliqués in which the original halopolymer material has from about 1 to about 100 percent of the surface halogen atoms to depths from about 10 to about 100 Å permanently substituted with hydrogen and oxygen or oxygen-containing groups of which from about 3 to about 100 percent of the oxygen or oxygen-containing groups are chemically bonded to an adhesive.

A further principal embodiment of the present invention provides for adhesive-oxyhalopolymer composites that are prepared from non-halogenated substrates, such as fibers, films and sheets, consisting of polymeric materials(non-halogenated), e.g., thermosetting and thermoplastic resins and plastics; ceramic materials; and/or metallic materials. The surface of the non-halogenated substrate is modified either by halogenation processes through bonding of halogen atoms to the polymer backbone, or by coating a halocarbon film thereto. The halogenated and halocarbon coated surfaces of the non-halogenated substrates are subsequently oxyhalogenated to provide reactive sites for chemically bonding with an adhesive to form the adhesive-oxyhalopolymers composites of the present invention.

BRIEF DESCRIPTION OF THE DRAWINGS

FIG. 4 is an enlarged sectional view of a further embodiment of the invention comprising a multilayered appliqué of FIG. 1 with additional mechanical or electrical component layer and adhesive layer bonded to the adhesive structure;

FIG. 5a is an exploded isometric view of the appliqué of FIG. 4

FIG. 5b is an isometric view of an alternative mechanical component layer in the form of a microcapillary/microtube layer;

DESCRIPTION OF THE PREFERRED EMBODIMENTS

For purposes of this invention, the terms and expressions below, appearing in the specification and claims, are intended to have the following meanings:

"Appliqué" as used herein is intended to mean protective and/or decorative coatings and films in the nature of laminates, layered composites and replaceable, strippable coated film structures, including paint replacement films, transfer coatings and decals, which may be decorative or non-decorative in appearance, all for application to interior and exterior surfaces, substrates, structures or devices, such as aerospace, land and marine vessels, vehicles and related devices; including applications such as for shielding from environmental effects, such as protection from lightning strike, EMI, static interference, magnetic or electrical conductivity to protective liners for vessels.

"Electromagnetic environmental effects" as appearing in the specification and claims is intended to mean external emissions, such as broadband noise, electromagnetic interferences, including electromagnetic pulses, lightning strikes, and the like;

"Permanent" as used herein mean substantially unchanged over an extended period of time.

Figure 1:
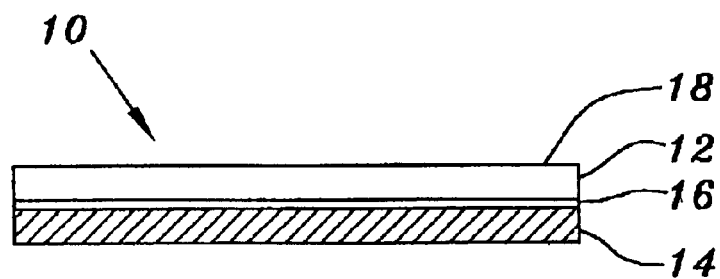
FIG. 1 is an enlarged sectional view of the basic two layer appliqué system of the invention.

FIG. 1 discloses the basic appliqué composite of the invention with halopolymer layer 12 and adhesive coating 14 engaged with oxyfluorinated surface 16 on the bottom side of halopolymer film layer 12. Only one surface 16 of halopolymer layer 12 has been permanently modified at the surface through the displacement of halogen atoms and the introduction hydrogen and oxygen or oxygen-containing groups. The upper outer surface 18 of halopolymer layer 12 remains unmodified and retains the native properties of the original halopolymer.

Halopolymers

"Halogenated polymers", or "halopolymer" and variations thereof as appearing in the specification and claims is intended to mean as classes of polymers: homopolymers, copolymers and terpolymers, which may or may not be perhalogenated. They are polymeric materials containing highly electronegative atoms referred to in the elemental periodic table as halogens, i.e., fluorine, chlorine, bromine, and iodine. The halogenated polymers preferred as starting materials for the adhesive-oxyhalopolymer composites and the paint replacement films and appliqués of this invention are those comprised of a carbon backbone, with practically any combination of fluorine, chlorine, hydrogen, and oxygen atoms bonded thereto. This includes polymeric carbon backbones containing one or any combination of two, three or four atoms out of the group of fluorine, chlorine, hydrogen and oxygen. For example, fluoro- and fluorochloropolymers, such as fluorohydrocarbon polymers like polyvinylidene fluoride (PVDF), polyvinyl fluoride (PVF),poly (vinyl difluoride), piezo and pyroelectic poled PVDF, polychlorotrifluoroethylene (PCTFE), polytetrafluoroethylene (PTFE), ethylenechlorotrifluoroethylene (ECTFE), fluorinated ethylene propylene copolymer (FEP), expanded polytetrafluoroethylene (ePTFE), and polyvinyl chloride (PVC), including copolymers and terpolymers thereof, for example, THV, although not totally inclusive, are all illustrative of starting halogenated polymers having carbon and fluorine atomic compositions, as well as polymers having carbon and chlorine; carbon, fluorine and chlorine; and carbon, fluorine and hydrogen. That is, they are generically known as halocarbons and halohydrocarbon polymers.

In addition to the halogenated polymers previously described as useful starting materials for the appliqués of this invention, the term "halopolymer" as appearing in the claims is intended to also encompass various other polymers, such as fluorinated and perfluorinated siloxanes, copolymers comprised of tetrafluoroethylene block segments with other non-halogenated polymeric blocks e.g., polytetrafluoroethylene -ether-urethane (PFEU), polyfluoroalkoxy polymers or copolymers comprising tetrafluoroethylene and perfluoro-2-2-dimethyl-1,3-dioxole e.g., Teflon-AF® (a DuPont trademark), perfluoroalkoxy-substituted fluoropolymers (PFA), such as MFA (available from Ausimont USA, Thoroughfare, New Jersey, sold under the trademark HYFLON®, obtained by the copolymerization of tetrafluoroethylene and perfluoromethylvinylether, perfluorinated polystyrenes and copolymers containing fluorinated styrene segments, fluorinated phosphazines, as well as a myriad of other polymeric materials containing halogenated functionality which can be segregated and exposed at the surface of the material creating a highly electronegative environment.

It is to be understood, that in some applications the base material may not be a halogenated material, and therefore, must be halogenated before further treatment with the methods of the present invention. Non-halogenated polymers, such as the polyolefins, for example, can have their surfaces halogenated by either gas-phase surface halogenation processes, or coated with a halocarbon based plasma film. Both processes are well known and documented in the art. Typically, gas phase halogenation polymers are exposed to a mixture of the halogen and nitrogen whereby halogen atoms become bonded to the polymer surface at the molecular level. Lagow and Margrave, *Progr. Inorganic Chem.*, Ed. S. J. Lippard, 26 (1979) 161 disclose methods of gas phase surface fluorination for imparting anti-reflective, low surface energy to various commercially available base polymers, such as highly cross-linked polyethylene, polypropylene, poly(methyl methacrylate), polycarbonate, polyester, polystyrene and polymethylpentene. D. T. Clark et al, *Jour. Polym. Sci.*, Polymer Chem. Ed., Vol. 13, 857–890 (1975) also disclose the surface fluorination of high density polyethylene films. The contents of both publications are incorporated herein by reference. Other representative enabling publications relating to gas phase fluorination methods include U.S. Pat. Nos. 3,988,491 and 4,020,223 which are also incorporated by reference herein.

Methods for preparing fluorocarbon plasma deposited films are also well documented in the literature. For instance, Haque and Ratner, *Jour. App. Polym. Sci.*, Vol. 32, 4369–4381 (1986) disclose suitable methods for modification of polymer surfaces with plasma deposited thin films using a capacitatively coupled RF-discharge system. Representative useful fluorinated gaseous materials include hexafluoro-ethylene, perfluoropropane and hexafluoropropene. K. Nakajima et al, *Jour. App. Polym. Sci.*, Vol. 23, 2627–2637 (1979) disclose methods for applying plasma polymerized fluorocarbon coatings which can be utilized for generating surfaces having low dielectric and non-corrosive properties. U.S. Pat. No. 4,718,907 to Karwoski et al discloses useful methods for introducing fluorinated coatings for vascular grafts and other biomedical technologies. The foregoing publications relating to methods for applying plasma deposited fluorocarbon coatings are incorporated-by-reference herein.

Representative non-fluorinated thermosetting materials that may be halogenated for further treatment include the phenolic, aminoplast and epoxy type resins, to name but a few. Thermoplastic materials include a broader range of resinous materials including, but not limited to the polyolefins, like polyethylene, polypropylene; acrylic resins which include esters of acrylic or methacrylic acids, sometimes modified with non-acrylic monomers.

Other useful non-halogenated base materials or substrates include ceramic materials and metallic materials, such as gold, nickel, copper, aluminum, non-ferrous alloys and ferrous alloys, such as steel, i.e., low and high carbon steel alloys, stainless steels, such as SS316L and SS304L. Representative non-ferrous alloys include the nickel based alloys available under well known trademarks Monel®, Hastelloy® and Inconel®.

Ceramic substrates may include classes of non-halogenated materials such as alumina, corderite, fosterite, porcelain (zircon), steatite, titanates (Ba, Sr, Ca, Mg and Pb), titanium dioxide, vitreous silica, borosilicates, quartz, and zinc crown glasses, to name but a few. Included within the ceramic substrates are the conductive, semi-conductive and dielectric materials, which are materials based on either oxides, carbides, nitrides and borides. Representative examples of non-halogenated conductive ceramics substrates contemplated are titanium nitride and titanium boride; semi-conductive ceramics include such representative examples as metal silicides like titanium silicide, tantalum silicide and tungsten silicide, and metal oxides like tin oxide, zinc oxide and copper oxide. Non-conductive ceramic materials include substrates containing glasses from the class of silicon oxides ($SiO_2$).

Regardless of whether the starting material is that of a bulk halopolymer or a non-halogenated material which has been surface halogenated or treated with a deposited halopolymeric film, it is necessary to permanently oxyhalogenate the halogenated material. In general, the incorporation or synthesis of oxygen sites on the surface of a halogenated polymer material need only be of such concentration that the oxygen functionality and resulting backbone of the polymer be stable. Generally, from about 1 to 100% of the original halogens of the halopolymer are substituted with hydrogen and oxygen or oxygen-containing groups, and preferably ranging from about 3 to about 70%. The oxygen functionality may take the form of oxo, hydroxyl, alkoxy, inclusive of methoxy, ethoxy and propoxy or R'—CO— or combinations thereof, where R' is hydrogen or alkyl, and particularly C1 to C5 lower alkyl, including methyl, ethyl, propyl, isopropyl, and so on. In addition, the oxygen functionality may also take the form of $PO_y$ or $SiO_y$, wherein y is 2–3.

The present invention contemplates virtually any suitable technique that modifies, without etching, the surface of halopolymer materials through the introduction of hydrogen and oxygen or oxygen-containing sites wherein the modified surface forms permanent bonds with an adhesive material without changing the morphological and hydrophobic properties of the original halopolymer.

A representative example of means for preparing oxyhalopolymers with the desired substituted hydrogen and oxygen or oxygen functionality groups is disclosed by J.A. Gardella, Jr. and T. G. Vargo in U.S. Pat. Nos. 4,946,903 and 5,266,309, the disclosures of which are incorporated herein by reference. According to Gardella and Vargo, hydrogen and oxygen or oxygen functionality groups are incorporated into halogenated polymers and resins by exposing them to a radio frequency glow discharge (RFGD) plasma comprised of a gas/vapor mixture, such as a hydrogen/water or hydrogen/methanol mixture. By using RFGD a variety of species generated from the gas/vapor plasma mixture become chemically active and covalently bond to the carbon backbone of the halopolymer. As a result, surface halogens bonded to the carbon backbone are replaced with hydrogen and oxygen or oxygen-containing groups but the morphological and hydrophobic properties of the resulting oxyhalopolymers remain substantially unchanged from the original halopolymer material. Using this procedure it has been shown that hydroxyl functionality can be permanently formed onto fluoropolymeric surfaces, especially suitable are such representative members as FEP, PTFE, ePTFE, MFA, PFA, ECTFE, PCTFE, PVDF, ETFE and copolymers, terpolymers and blends thereof.

Accordingly, the RFGD methods of Gardella and Vargo provide a useful means for producing permanently modified surfaces having oxygen functionality which can be subsequently chemically bonded to an adhesive on at least one side to form the basic appliqués of this invention. In addition, these basic appliqués allow for preparation of a wide range of useful layered film/adhesive combinations for constructing novel appliqués having unique properties with significant end-use applications.

As previously indicated, in preparing the adhesive-oxyhalopolymer composites, useful starting materials include the halopolymeric materials cited above which are treated such that incorporation of reactive oxygen functionality onto the molecular structure of the halogenated polymer is readily accomplished. The objective is to introduce hydrogen and either oxygen or oxygen-containing groups onto the halopolymeric material and thereby displace some of the halogen atoms to form a stable material. This does not include the introduction of oxygen atoms into the polymer backbone per se, but only in substituting existing halogen atoms. As stated earlier, the oxygen functionality may be varied and include such representative examples as hydroxyl (—OH), ether (C—O—C), epoxide (—O—), aldehyde (—HC=O), ester (O=C—O—) or carboxylic acid (—COOH) in addition to those mentioned above. These oxygen functionalities have the desired electronic characteristics and chemical reactivity required according to this invention. Specifically, these oxygen functionalities when incorporated onto the carbon backbone of a polymer which also contains electronegative atoms, such as fluorine or chlorine (or functional groups containing these atoms) have properties similar to Bronstead acids (e.g. in the cases of hydroxyl and the carboxylic acid functionality) or, Lewis bases which are able to donate lone pairs of electrons in the cases of the epoxide, aldehyde, ester and ether functionalities.

Adhesives

Upon completion of substituting surface halogen atoms with hydrogen and oxygen or oxygen functionality groups the oxyhalogenated material 16 is contacted with an adhesive 14 either immediately or some time in the future because timing does not affect the performance of the product. Any adhesive that bonds to an oxygen or oxygen functionality reactive site may be used in the present invention including either natural or synthetic types. Natural adhesives may include different types; such as animal, vegetable and mineral, such as shellac, gum arabic resins, carnauba wax, linseed oils, mineral waxes, amber resins to name a few. Synthetic adhesives may include elastomers, thermoplastic and thermosetting types, such as synthetic rubber, cellulose derivatives, alkyd resins, acrylic resins, vinyl acetates, epoxy resins, polyurethane resins, vinyl polymers, polyesters, polyacrylates, polyethers, polysulfones, water-dilutable urea resins, amino plastics, phenolic resins, polyaromatics, furanes, and copolymers or blends thereof.

Generally, thermoplastic adhesives are a class based upon long-chained polymeric structure, and are capable of being softened by the application of heat. Thermosetting adhesives are a class of adhesives based upon cross-linked polymeric structure, and are incapable of being softened once solidified. Both thermoplastic and thermosetting adhesives are cured (set, polymerized, solidified) by heat, catalysts, chemical reaction, free-radical activity, radiation, loss of solvent, etc., as governed by the particular adhesive's chemical nature. Elastomers are a special class of thermoplastic adhesives possessing the common quality of substantial flexibility or elasticity. Pressure-sensitive adhesives are permanently tacky solids and form bonds when pressure is applied. They are available as films, tapes and hot-melt solids.

Of particular interest are adhesive compositions, such as, for example, alkyd resins; acrylic resins, two-component epoxy resins; polyurethane resins; polyester resins, which are usually saturated; water-dilutable phenolic resins or derived dispersions; water-dilutable urea resins; resins based on vinyl/acrylic or vinyl acetate copolymers; and hybrid systems based on, for example, epoxy acrylates.

More specifically, the alkyd resins can be water-dilutable alkyd resin systems which can be employed in air-drying form or in the form of stoving systems, optionally in combination with water-dilutable melamine resins; the systems may also be oxidatively drying, air-drying or stoving systems which are optionally employed in combination with aqueous dispersions based on acrylic resins or copolymers thereof, with vinyl acetates, etc.

The acrylic resins can be pure acrylic resins, epoxy acrylate hybrid systems, acrylic acid, or acrylic ester copolymers, combinations with vinyl resins, or copolymers with vinyl monomers such as vinyl acetate, styrene or butadiene. These systems can be air-drying systems or stoving systems.

In combination with appropriate polyamine crosslinkers, water-dilutable epoxy resins exhibit excellent mechanical and chemical resistance. If liquid epoxy resins are used, the addition of organic solvents to aqueous systems can be omitted. The use of solid resins or solid-resin dispersions usually necessitates the addition of small amounts of solvent in order to improve film formation.

Preferred epoxy resins are those based on aromatic polyols, especially those based on bisphenols. The epoxy resins are employed in combination with crosslinkers. The latter may in particular be amino- or hydroxy-functional compounds, an acid, an acid anhydride or a Lewis acid. Examples thereof are polyamines, polyaminoamides, polysulfide-based polymers, polyphenols, boron fluorides and their complex compounds, polycarboxylic acids, 1,2-dicarboxylic anhydrides or pyromellitic dianhydride.

Polyurethane resins are derived from polyethers, polyesters and polybutadienes with terminal hydroxyl groups, on the one hand, and from aliphatic or aromatic polyisocyanates on the other hand.

Examples of suitable polyvinyl resins are polyvinylbutyral, polyvinyl acetate or copolymers thereof.

Suitable phenolic resins are synthetic resins in the course of whose construction phenols are the principal component, i.e. in particular phenol-, cresol-, xylenol- and resorcinol-formaldehyde resins, alkylphenolic resins, and condensation products of phenols with acetaldehyde, furfurol, acrolein or other aldehydes. Modified phenolic resins are also of interest.

The above named adhesives represent only a sample of the many different types that can be chemically bonded to the reactive sites on oxyhalogenated polymer substrates. The method of application of the adhesive is dependent upon the particular end use and the adhesive. For example, adhesives can be brushed, sprayed, dipped, nip rolled, reverse rolled, gravure coated, UV coated or by any practical method. The adhesive may be applied directly to an oxyhalopolymer material, such as a film or to another substrate that in turn will be covered or contacted with the oxyhalopolymer film. Preferably, pressure sensitive adhesive is directly laminated onto the surface of the oxyhalopolymer film by nip rolling under an optimum load pressure which is dependent upon the specific adhesive and is well known to those skilled in the art.

Each individual adhesive will predetermine the application parameters and final properties of the adhesive surface, e.g., surface preparation, cure time, external surface(either rough or smooth), prevention or reduction of galvanic, atmospheric and chemical corrosion, insulating properties, vibration dampening, distribution of stresses, service-temperature limitation, service deterioration, fatigue properties, storage life or assembly toxicity. An extensive list of properties and application methods can be found in J. Shields, "Adhesives Handbook." CRC Press(Division of The Chemical Rubber Co.), 1970, the content of which is incorporated herein by reference.

The amount and thickness of adhesive material that is chemically bonded to the modified halopolymer is dependent upon the properties of the specific adhesive and the anticipated end use of the composites. Generally, from about 1 to about 10 mils of adhesive is applied for chemical bonding to the modified halopolymers, i.e., halopolymer with the permanently modified oxyhalogenated surface.

Using the reactive oxygen functionality sites on the oxyhalopolymeric material, an adhesive can be directly applied to the modified surface, especially in cases where the density of the reactive oxygen functionality is sufficient to allow good interfacial wetting of the adhesive. However, in some situations depending on the type of adhesive, such as a water based adhesive, the reactive oxygen functionality sites may initially be bonded to a crosslinking agent, such as an organosilane coupling agent thereby increasing surface wettability of the oxyhalopolymer. In turn, the crosslinking agent may be contacted with an adhesive thereby obtaining a stronger bond between the oxyhalopolymer and adhesive. Organosilane coupling agents are available in a variety of formulations such that they possess a variety of reactive organic ligands, such as amines, epoxides, vinyls, thiols among many others. These organic ligands are subsequently useful for reacting with adhesives which possess corresponding chemical functionality which are compatible or reactive to the organic ligand presented by the organosilane coupling agent. Representative organosilane coupling agents that are useful in the present invention have the formula:

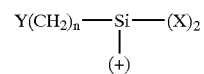

in which Y is a member selected from the group consisting of allyl, alkyl, haloalkyl, amino, mercapto, epoxy, glycidoxy, methacrylate, cyano and —CH$_2$CO$_2$alkyl, wherein n is from 0 to 17 and X is independently selected from hydrogen, halogen, alkyl, haloalkyl, alkylamino, alkoxy, trialkylsiloxy, vinyl and epoxy.

Halopolymer Additives

Figure 2:
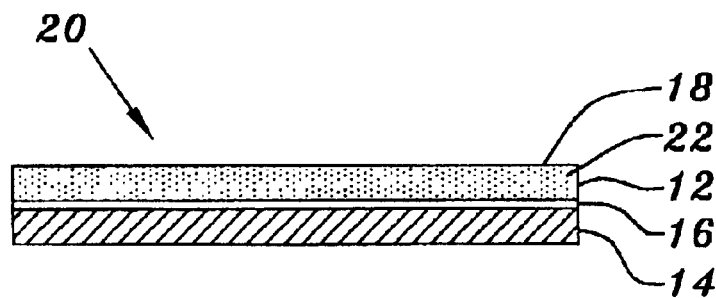
FIG. 2 is an enlarged sectional view of a two layer appliqué of the invention according to FIG. 1 with additives introduced into the halopolymer layer.

Also contemplated is the use of the above halogenated polymers with surface features, such as enhancement of laminar flow, and further includes halogenated polymers containing various additives 22 (FIG. 2), like carbon, metals, metal oxide particles, flakes, fibers capable of imparting thermal, optical, magnetic, electromagnetic, electronic, or mechanical properties to the halogenated polymer layer 12.

Numerous methods for introducing additives 22 to polymeric resins are known to those skilled in the art. For example, additives 22, such as antioxidants, processing aids, slip agents, electrically conducting agents, antistatic agents, lubricants, UV stabilizers, optical dispersion or absorption elements, controlled emissivity agents and colorants can be dry blended in either pellet or powder form or melt blended using an extruder or other suitable melt blending apparatus. Specifically for halopolymers, additives are usually introduced or incorporated by compounding via mechanical mixing or compounding under melt conditions and then pelletizing for subsequent extrusion or film conversion.

For example, U.S. Pat. No. 6,395,795 describes various blending methods for incorporating additives, such as TiO$_2$, inorganic salts (e.g., sodium tetraborate), and sulfonic acid salts into various halopolymer resin systems by extruding a halopolymer resin mixed with TiO$_2$, an inorganic or sulfonic acid salt through a Model CTSE-V extruder, available from C. W. Brabender, South Hackensack, N.J., equipped with co-rotating conical twin compounding mixing screws and a strand cutter to pelletize the halopolymer, TiO$_2$, and inorganic salt mixture. This pellet blend can then be subsequently fed through a standard commercially available film extruder for fabricating halopolymer films containing TiO$_2$, and an inorganic or sulfonic acid salt. Similarly, U.S. Pat. No. 6,287,702 describes fluoropolymer melt compositions where additives are incorporated by melt compounding fluoropolymer resins and additives in a twin-rotor mixer with roller type rotors (Rheomix.RTM. 3000, Haake Buechler) controlled and driven by Haake's Rheocord.RTM. 40 microprocessor. Alternatively, U.S. Pat. No. 6,336,988 describes the introduction of additives to a PVDF (Polyvinylidene fluoride) halopolymer using a Davis Standard single screw extruder to obtain uniformly blended pellets comprised of PVDF (halopolymer available from Elf Atochem as Kynar 720), various UV stabilizers (e.g., Tinuvin® 234 available from Ciba Geigy; Cyasorb®, available from Cytec; various polymeric additives (e.g., polymethylmethacrylate from Atohaas), pigments (e.g., Magenta and violet D-60 dispersions, 93 exterior white and DPP red BO 460-36351, as described in the Examples section of U.S. Pat. No. 6,336,988). The above list of compounding methods is referenced, but only to illustrate the sundry of methods available for compounding additives and other materials directly into the halopolymers.

Compounded halopolymer films can then be converted (either one side or both sides) in order to produce the reactive oxyhalopolymer surface as described within this disclosure.

As previously mentioned, a wide range of additives 22 can be incorporated into the base halopolymer before or after conversion of the halopolymer resin into film and subsequent conversion into the oxyhalopolymer. Further, depending on the application and the desired effect loadings of such additives can be controlled, and are contemplated to be most useful within a range from about 0.001% to about 50% by volume. For example, to achieve magnetic, thermal or electrical qualities, preferred loadings of magnetic and/or conductive particles, powders, fibers, or whiskers will require an amount in the range of about 20% to about 50% loading of the halopolymer by volume, whereas for UV absorption, pigmenting, or other optical qualities, preferred loadings can be achieved within the entire range of about 0.001% to about 50% by volume.

Accordingly, an object of this invention is to provide for halopolymers 12 containing additives 22 for changing optical, magnetic, and thermal characteristics of the halopolymer, including conducting polymeric, carbon, metallic, and inorganic particles, all of which may be in a format of fibers, whiskers and flakes.

For example, pigments are generally used to contribute to the optical and other properties of applications, such as coatings, inks, extrusions, paints, finishes, glass, ceramics and cosmetics. Many varieties of pigments exist, some of which are metal flake based. These metal flakes comprise a thin film metal layer for improving the luster, sparkle, shine, absorption, hiding and/or reflective optical properties of the application. The optical performance of the pigments, however, is duly constrained by the inherent limitations of each metal flake therein and is fully described in U.S. Pat. No. 6,387,498 which is incorporated by reference herein.

Additional representative examples describing the use additives of metal powders and flakes for controlling optical properties include U.S. Pat. No. 5,198,042, entitled "Aluminum Alloy Powders for Coating Materials and Materials Containing the Alloy Powders,"; U.S. Pat No. 4,213,886, entitled "Treatment of Aluminum Flake to Improve Appearance of Coating Compositions," U.S. Pat. No. 4,629,512, entitled "Leafing Aluminum Pigments of Improved Quality," and U.S. Pat. No. 5,593,773, entitled "Metal Powder Pigment."

Accordingly, the present invention contemplates alternatives for producing economically a thin, rigid and brittle metal flake having improved characteristics for improved reflectance of metal flake-based pigments.

The multifunctional oxyhalopolymer appliqués of the invention can also be fabricated to provide electromagnetic absorbing characteristics by adding both relatively resistive fibers (inorganic oxides) and relatively conductive fibers (carbon, metallic, or ferroelectric Fe$_2$O$_3$) into the halopolymeric film via techniques described and referred to herein. The bandwidth of the absorber appliqué is determined by the relative conductivities of the fibers selected.

The appliqués 20 may also contain additives 22 within the halopolymer that provide anti-static, magnetic, or electrical conductivity. In this regard, U.S. Pat. No. 6,402,804, for example, describes metallic fibers and their incorporation as additives into polymeric articles for imparting electrical conductivity. Others include, U.S. Pat. No. 6,379,589 which discloses the fabrication of a polymeric film for magnetic shielding by blending metals, conducting polymers and magnetic particles (carbonyl iron) into a polymeric matrix. For the present invention that would be the halopolymer appliqué material.

The halopolymeric layer 12 may also include additives 22 for increased abrasion resistance like metallic oxides, carbides, nitrides, and the like. Optional additives also contemplated include coloring agents or UV stabilizers, like inorganic and organic pigments or dyes and mixtures thereof. For example, pigments comprised of glass, mica, metals (available from Novamet), or glass flake, silver coated glass flake, mica flake, available from Potters Industries, or various metal oxides available from NL Industries, Fischer Scientific, NANOTEK, or Nanophase Technologies.

Methods for adding such pigmentation or dyes in a patterned fashion (e.g., the addition of a camouflage color scheme into the halopolymeric film) via the use of sublimation transfer techniques are contemplated by these inventors. Additionally, the incorporation of zirconium compounds or other electrostatic materials capable of charge transfer can be added as useful charge control agents for an electrophotographic toner or for facilitating patterned or imaged sublimation of colors, designs, patterns, or illustrations directly into the halopolymeric (or oxyhalopolymeric) films used in fabricating the appliqués.

Other desirable, but optional additives 22 for the halopolymer, may include mica or metallic flakes for enhanced permeation barrier qualities. For example, DuPont's Ruby Red® fluoropolymer (mica in PFA) or Sparkling Beige® fluoropolymer (mica in ETFE), both commercially available, can be extruded into films that have significantly reduced permeation characteristics with respect to the permeation of organic, inorganic and aqueous gases or liquids.

Finally, other useful optional additives 22 for enhancing electrical or thermal conductivity include metallic particles, fibers, whiskers, or flakes, conductive polymers, and/or graphitic fibers or whiskers. Foul release characteristics can be obtained via the addition of PTFE fluoropolymer to other halopolymers and inorganic salts or oxides can be added for minimizing flammability, smoke and flame toxicity.

Adhesive Additives

Figure 3:
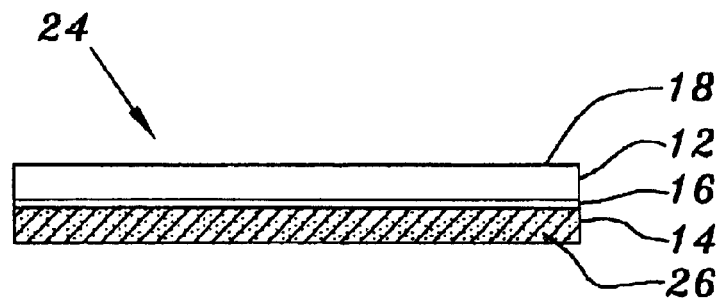
FIG. 3 is an enlarged sectional view of the two layer appliqué system of the invention according to FIG. 1 with additives incorporated into the adhesive layer.

The adhesive layer 14 (FIG. 3) of the appliqué 24 may comprise one or more optional materials 26 taken, for example, from the group consisting of pigments, dyes, fillers, conductive fillers, flow control agents, dispersants, thixotropic agents, flame and smoke retardants, adhesion promoters, antioxidants, UV stabilizers, light stabilizers, curing catalysts, etc. They may also include other known anticorrosion agents, for example anticorrosion pigments, such as phosphate or borate-containing pigments or metal oxide pigments or other organic or inorganic corrosion inhibitors, for example salts of nitroisophthalic acid, phosphoric esters, technical-grade amines or substituted benzotriazoles.

Representative examples of useful pigments and UV blockers include titanium dioxide, zinc oxide, iron oxide, aluminum bronze, phthalocyanine blue, and so on. In addition, inorganic pigments, such as Ultramarine blue, carbon black, and organic pigments, such as phthalocyanines, quinacridones and perylenes, and dyes, like nigrosin and anthraquinones, may be added as colorants.

Examples of useful fillers suitable for imparting antioxidant properties or UV shielding to the appliqués, are talc, alumina, aluminum silicate, barytes, mica, silica, etc. The corrosion inhibitors can also be applied to these support materials. Pulverulent fillers or pigments are particularly suitable for this purpose. Additional examples of oxidation inhibitors and thermal stabilizers are sterically hindered phenols, hydroquinones, aromatic secondary amines, such as diphenylamines, and various substituted representatives of these groups, and mixtures of these in concentrations of up to 1% by weight, based on the weight of the thermoplastic molding compositions. Additional, examples of UV stabilizers, generally used in amounts of up to about 2% by weight, are various substituted resorcinols, salicylates, benzotriazoles and benzophenones.

Examples of conductive fillers are selected from the group consisting of conductive carbon black, conductive carbon fibers including milled fibers, conductive carbon fibrils, and various mixtures thereof. In addition various metals, metal flakes, such as Fe, Sn and Al or an alloy thereof is suitable for use as the additive. Useful metal oxides include oxides of Mn, Fe, Zr and Ti such as $TiO_2$, $ZrO$, $MnO_2$ and $Fe_2O_3$, for example. Useful metal carbides include carbides of Ti, Zr, V, Nb, Ta, Mo and W such as TiC, ZrC, VC, NbC, TaC, $Mo_2C$ and WC, for example. Useful metal nitrides include nitrides of Ti, Zr, V, Nb, Ta and Cr such as TiN, ZrN, VN, NbN, TaN and $Cr_2N$, for example. Useful metal borides include borides of Ti, Zr, Nb, Ta, Cr, Mo, W and La such as CrB, $TiB_2$, $ZrB_2$, $NbB_2$, $TaB_2$, MoB, WB and $LaB_6$, for example. The applicable metal silicides include silicides of Ti, Zr, Nb, Ta, Cr, MO, W and Fe, such as $TiSi_2$, $ZrSi_2$, $NbSi_2$, $TaSi_2$, $CrSi_2$, $MoSi_2$, $WSi_2$ and ferrosilicon, for example. Use may be made of any one or a mixture of two or more of the additives mentioned above.

Flow control agents and thixotropic agents, when used, are based, for example, on modified bentonites.

Adhesion promoters are based, for example, on modified silanes.

Also of advantage is the addition of basic fillers or pigments, which impart both UV shielding properties, which gives rise to a synergistic effect on corrosion inhibition. Examples of such basic fillers and pigments are calcium carbonate or magnesium carbonate, zinc oxide, zinc carbonate, zinc phosphate, magnesium oxide, alumina, aluminum phosphate or mixtures thereof. Examples of basic organic pigments are those based on aminoanthraquinone.

Corrosion inhibitors, and other optional additives, can be incorporated into the adhesive material during its preparation, for example, during pigment dispersion by grinding, or when the inhibitor is dissolved in a solvent, and the solution then stirred into the adhesive composition. Various corrosion inhibitors including certain aminophosphonic acids or aminophosphorous acids and/or their zirconium, bismuth and calcium salts, and salts thereof with certain amines may be used.

One of the objects of this invention, is to provide specifically for a multifunctional oxyhalopolymer appliqué coating systems which, utilizes an adhesive system that firstly, inhibits or eliminates entirely the corrosion of metals, and secondly, promotes good adhesion of the oxyfluoropolymer to a metallic or metallic composite surface or material.

Table 1 below lists representative corrosion inhibitors for this invention, including several environmentally benign amine based vapor phase corrosion inhibitors available from Cortec and Morpholine and Holdtight. For example, HoldTight® 102 and Cortec® VCI-377 are both water based corrosion inhibitors that are environmentally benign, nonhazardous corrosion inhibitors contemplated for this invention.

TABLE 1

Corrosion Inhibitors

| Corrosion Inhibitor | Composition | Supplier | Recommended Loading |
|---|---|---|---|
| Hispafos ® SP | Zinc Phosphate | Delta Colours Lawrenceville, GA | 3% |
| Actirox ® 106 | Molybdenum/Zinc Phosphate | Delta Colours | 3% |
| CW-491 ™ | Calcium Phosphosilicate | Halox Hammond, IN | 5–15% |
| CZ-170 ™ | Zinc Orthophosphate | Halox Hammond, IN | 2–5% |

TABLE 1-continued

Corrosion Inhibitors

| Corrosion Inhibitor | Composition | Supplier | Recommended Loading |
|---|---|---|---|
| PhosPlus ® | Zinc phosphate | Laporte | 2–3% |
| Morpholine | Morpholine Vapor Phase Corrosion Inhibitors | BASF | 0–2% |
| Cortec ® | Proprietary Vapor Phase Corrosion Inhibitors | Cortec Corp. St.Paul, MN | 1–3% |
| Irgacor ® 1405 | p-Tolylbutyric acid adduct | CIBA Spec. Chemicals | 3% |

In addition to the above list of corrosion inhibitors we also contemplate the incorporation of alkali metal, alkaline earth metal, transition metal and amine salts of carboxylic acids, and of transition metal complexes of ketocarboxylic acids into the adhesive layer contained within the multifunctional appliqué coating system disclosed herein. The use of these materials as corrosion inhibitors is known, and is described, for example, in U.S. Pat. No. 4,909,987, EP-A-0 412 933, EP-A-0 496 555, EP-A-0 554 023 or EP-A-0 619 290.

Further, EP-A-0 437 722 discloses certain amine oxides of phosphonic acids as corrosion inhibitors. U.S. Pat. No. 4,000,012 describes an anticorrosion effect of iron phosphate or zinc phosphate coatings on steel, the action of which is markedly improved by treatment with a solution of an α-aminophosphonic acid or water-soluble salts thereof. U.S. Pat. No. 4,076,501 discloses anti-corrosion of metals by means of diphosphonic acids. U.S. Pat. No. 4,917,737 discloses a method of sealing off a phosphated metal substrate using certain alkylaminodiphosphonic acids. U.S. Pat. No. 3,925,245 (DE-A-2 231 206) refers to a corrosion-inhibiting composition for metal surfaces, comprising inorganic nitrites and aminoalkylphosphonic acids. U.S. Pat. No. 3,837,803 (DE-A-2 335 331) relates to a process of corrosion inhibition for metallic components which are in contact with aqueous systems, through the use of synergistic mixtures of water-soluble organophosphonic acids and their salts, a water-soluble orthophosphate, and calcium ions. U.S. Pat. No. 3,483,133 relates to the use of certain aminomethylphosphonic acids as corrosion inhibitors for metals in aqueous systems. GB-A1201 334 likewise discloses the use of certain phosphonic acids as corrosion inhibitors for metals in aqueous systems. GBA2,121 419 further discloses the use of certain phosphonic acids as corrosion inhibitors in coating materials. All of these corrosion inhibitors are deemed useful as additives to the adhesive systems used in fabricating the multifunctional oxyfluoropolymer appliqués described within this invention.

Further Additives

In addition, the present invention relates to introducing electrically conductive properties to both the halopolymer layer as well as the polymeric adhesive resins used in fabricating the appliqué system described herein.

Electrically conductive polymer based compositions are used in many industrial applications, such as for dissipating electrostatic charge from plastic parts, and plastic boxes for shielding electronic components from electromagnetic interference (EMI). Examples for electrostatic discharge (ESD) applications are electronic packaging, clean room installations, storage trays, water carriers, chip carriers and construction components for explosion-proof environments.

Compounds tailored for dissipating static electricity have a typical surface resistivities of $10^2$ to $10^{13}$ ohm/square and compounds specified for EMI shielding applications typically exhibit volume resistivity of $10^{-2}$ to $10^2$ ohm-cm.

There is known in the art polymer based compounds having appropriate resistivity for both static electricity dissipation and EMI shielding. One class of compounds known in the art is based on polypropylene (PP) or polyethylene (PE) with high carbon loading levels up to 40 to 60% by weight characterized by surface resistivity of about $10^3$–$10^8$ ohm/square. For applications requiring EMI shielding, weight loading levels of 30 to 50% polyaniline carbon fibers, 40% aluminum flakes, 15% nickel-coated carbon fibers or 5 to 10% stainless steel fibers can be used for the same class of polymers.

A variety of methods exist which can be used for increasing the electrical conductivity of polymers, and which are useful for applications for increasing electrical conductivity of the halopolymers, and the adhesives disclosed herein. Specifically, methods previously discussed, such as mechanical, solvent, and thermal mixing and compounding of the halopolymers or polymeric adhesive resins can also be used to fill the layered appliqués with conductive additives such as in electrical layer 30, such as metallic powders, metallic fibers, metallic flakes, carbon black, carbon fibers, and recently, with intrinsically conductive polymeric powders.

Other representative methods are disclosed, for example, in U.S. Pat. No. 4,169,816. This patent discloses an electrically conductive single thermoplastic material composition with a high carbon content, the composition including for each 100 parts of polypropylene-ethylene copolymer 15–30 parts of carbon black, 0.25 to 1 part of silica and 1–10 parts of a fiber reinforcing agent selected from carbon fibers, or a mixture of carbon fibers and glass fibers.

U.S. Pat. No. 5,004,561 discloses a further single thermoplastic based electrically conductive composition with a high carbon content, the composition includes for each 100 parts of thermoplastic resin selected from the group of polyolefin, polystyrene and acrylonitrile/styrene/butadiene (ABS) copolymer resin, polybutylene terephthalate (PBT) resin, polyphenylene ether and polyamide (PA) resin, from 30 to 300 parts of electrically conductive glass fibers, and from 5 to 40 parts of carbon black and from 5 to 40 parts of graphite.

Russian Patent No. SU 1,643,568 discloses a high carbon based electrical conductive thermoplastic composition in which electrical conductivity is achieved from the dispersion of carbon in the matrix. The composition includes 20–35 weight percent polypropylene, 10–20 weight percent polyamide, 20–30 weight percent carbon black, 10–20 weight percent graphite and 15–20 percent glass fibers.

In the preparation of the adhesive system for use in fabricating the multifunctional oxyfluoropolymer appliqués of the invention, either by addition polymerization or condensation polymerization of monomers, additives (including corrosion inhibitors, conducting materials, pigments, dyes, fillers, flow control agents, dispersants, thixotropic agents, flame and smoke retardants, adhesion promoters, antioxidants, UV stabilizers, light stabilizers and curing catalysts) can be mixed in solid form directly to the fully polymerized adhesive resin system (either mechanically, thermally or via the use of compatible solvents). Alternatively, they may be dissolved with the monomers even prior to the polymerization reaction. The concentration of these additives can be varied depending on the application. However, for the purposes of this invention the additives may range from about 0.001% to about 50% by volume.

The adhesive materials can then be applied to the oxyfluoropolymer surface according to methods, for example by spraying, dipping, spreading or cold lamination or transfer from a previously coated release liner. In many cases, a plurality of coats can be applied. The corrosion inhibitors are added primarily to the adhesive layer (primer), since they are active in particular at the interface of the appliqué system and the substrate the appliqué is applied to e.g., aircraft, railcar, chemical storage vessel, etc.

Finally, depending on whether the adhesive is a physically, chemically or oxidatively drying resin or a heat-curing or radiation-curing resin, the adhesive is cured at room temperature or by heating (stoving) or by irradiation.

Various synthetic elastomers containing olefinic double bonds and vulcanizing agents have been demonstrated to possess acoustic dampening properties in the vulcanized state. In fact, these materials have also been used as adhesives for also imparting a dampening effect which minimizes mechanical vibrations in metallic structures.

Aircraft, marine vessels, motor vehicles, machines and appliances commonly contain large percentages of thin metal sheets within their structures. Mechanically moving parts or running engines unavoidably cause these thin sheets to vibrate—often in the hearing range of the human ear. These vibrations are propagated in the form of mechanical vibration throughout the entire vehicle, machine or appliance and can be radiated into the air as troublesome noise at remote places. Accordingly, to reduce sound radiation and vibration, these sheets can be provided with noise-dampening coatings, or so-called anti-vibration coatings, especially in automobile manufacturing, and in the manufacture of domestic appliances.

In order to attenuate or dampen these vibration/sound effects a variety of fillers, additives and vulcanized rubber based adhesives can be extruded, or added to films bonded to metallic surfaces of vehicles, machines, appliances, and so on.

Accordingly, as a further embodiment, our invention contemplates the introduction of vulcanized rubber/elastomers directly into the adhesive system of the multifunctional appliqués.

Extrusion of any of the adhesive systems in accordance with this invention with fillers of high specific gravity and bitumen can be performed, and subsequently bonded directly to the oxyfluoropolymer appliqué films for fabricating a singular coating system having corrosion protection properties in concert with mechanical vibrational damping characteristics.

Alternatively, the adhesive system itself may comprise a vulcanized olefinic adhesive suitable for imparting the mechanical dampening characteristics sought, or further, the vulcanized olefinic (or other synthetic rubber material) can be cured into small particles, or solid micro forms (spheres, cubes, rods, etc.) from about several micrometers to several hundred millimeters in size, and subsequently, added to a preferred adhesive system as previously discussed, e.g., epoxy resins, polyurethane resins, amino resins, acrylic resins, acrylic or vinyl acetate copolymer resins, and so on.

The concentration of these small particulates within the adhesive system can vary depending on the application, but will generally range from about 0.10% to about 50% by volume.

The invention further contemplates the use of composites, metals, ceramics, or other organic materials that are fabricated into small particles, or solid or hollow micro forms (spheres, cubes, rods, etc.) from about several micrometers to several hundred millimeters in size that can also be added to a desired adhesive system. The concentration of these particulates is also in the range of about 0.1% to about 50% by volume. The addition, of these particulates to the adhesive system will provide not only vibrational damping characteristics but also resistance to impact/deformation.

Numerous efforts have been made to reduce the complexity of manufacturing vehicles, machines and appliances, and hence reduction in manufacturing costs. Accordingly, there is a need for "multifunctional products", e.g., a coating system (e.g., oxyfluoropolymer appliqué), which besides its main function, is also capable of solving other technical problems. For example, European Pat. EP-A-358 598 and German DE-A-3 444 863 disclose plastisol formulations, which perform dual functions of undersealing (protection against abrasion) and acoustic dampening. DE-A-4 013 318 describes a two-layer undersealing compound which performs the function of undersealing and absorbing the noise emanating from impacting particles (stones, chippings, water, etc.). Although these products/processes perform the dual function of undersealing and noise damping satisfactorily, there is a need to combine the functions of these products into a singular coating system (i.e., an appliqué). This is particularly desirable for sections of aircraft, marine vessels, automobiles, chemical storage tanks, railcars, or in the case of a machine or an appliance where protection against corrosion, abrasion, smoke and flame, UV radiation and other physical, optical, electronic effects, are desired in one product.

Further Embodiments

A further important aspect of this invention is illustrated by FIGS. 4–5 wherein the fabrication of multiple layers of adhesive to the base halopolymer/oxyfluoropolymer film material are employed with the objective of encapsulating other polymeric, semiconducting, inorganic, conducting, or metallic films or objects within the adhesive system. More specifically, this aspect of the invention relates to the encapsulation of multi-dimensional machines or devices comprised of polymeric, ceramic, metallic materials, etc. The base appliqué consisting of halopolymer layer 12 and adhesive layer 14 bonded on one side to the oxyhalopolymer modified surface 16 of the halopolymer layer includes a further outer layer of adhesive 32. However, sandwiched between adhesive layers 14 and 32 is an intermediate mechanical/electrical component layer 30 for encapsulating various mechanical and electrical devices.

For instance, mechanical/electrical component layer 30 may consist of RF, or microwave sensitive antennae for transmitting and/or receiving communications, electrodes for providing electrical and/or chemical transduction of signals arising from sensor objects incorporated within the adhesive layers,or light tubes, or fiber optics in the form of a networks for carrying signals or optical communications; or on the surface of the coated substrate, electrically conductive film, foil, mesh, or screen for providing protection against various electromagnetic environmental effects. Also intended for mechanical/electrical component layer 30 are deformable polymeric and/or gel-like spheres (not shown), as well as polymeric and metallic micro-honeycombed, 3-dimensional deformable structures (not shown) of suitable design for absorption of shock and impact, and the introduction of component 34 consisting of polymeric or metallic microcapillary or tubular ducts 36, tubes, heat pipes, and the like for thermal management.

MIL-STD-464, for example, describes the importance of electromagnetic environmental effects when incorporating materials into the design of aircraft. It is essential that all systems, subsystems and equipment used in constructing an aircraft, or aircraft components be compatible with both internal electromagnetic emissions, (e.g., electronic noise, RF transmissions, and cross coupling of electrical currents), and external emissions (e.g., lightning and electromagnetic pulses). Therefore, the design of an appliqué material as a paint replacement alternative requires that the appliqué not only have characteristics, like resistance to environmental corrosion and durability, but also possess electronic characteristics that comply with the specifications detailed in publication MIL-STD-464 for arresting lightning attachment effects.

The invention also contemplates the incorporation of T/R modules, for example, like those disclosed by U.S. Pat. No. 4,967,201, dated Oct. 30, 1990, for "Multi-Layer Single Substrate Microwave Transmit/Receive Module", to Edward L. Rich, III, the contents of which are hereby incorporated by-reference herein. The module disclosed by Rich is referred to as a "sugar cube" T/R module and includes a single multi-layer substrate having at least two opposed mounting surfaces where such mounting surfaces can effectively be thin layers of adhesive material. The substrate includes a plurality of integrated dielectric layers, electrical conductors and thermal conductors selectively interconnected between the layers of the substrate. Microwave signal processing means is mounted on at least one of the mountings (for our invention the mounting surface would be one of the adhesive surfaces) of the substrate for processing microwave signals. Control signal processing means is also mounted on at least one of the mounting surfaces (e.g., adhesive layers) of the substrate for providing control signals for the microwave signal processing means. Power conditioning means is additionally mounted on at least one of the mounting surfaces of the substrate for providing energy to power the microwave signal processing means and control signal processing means. A heat sink interface is coupled to a set of thermal conductors or vias passing vertically through the substrate layers, and which are positioned in thermal proximity to selected portions of the microwave signal processing means, the power conditioning means, and the control signal processing means for conducting thermal energy away from the heat generating elements mounted on the substrate to a heat sink.

Additional examples of T/R modules relevant for use in our oxyfluoropolymer multifunctional appliqués include another T/R module disclosed in U.S. Pat. No. 5,745,076, for "Transmit/Receive Module For Planar Active Apertures", issued to Thomas R. Turlington et al on Apr. 28, 1998, the contents of which are incorporated herein by-reference. The T/R module disclosed and referred to by the assignee as a StackPak® (a registered trademark of the Northrop Grumman Corporation) comprises a module configuration which plugs into the backside of an active aperture and includes discrete RF, DC power and data distribution manifolds which are planar in configuration and are stacked together one on top of the other between a cold plate and an antenna assembly, with the antenna elements and circulators being assembled in a single physical unit which forms the front layer of the aperture.

The T/R module itself comprises a multi-chip microwave package comprised of multiple layers of high temperature cofired ceramic (HTCC) including ground planes, stripline, data and DC interconnects, thermal vias and RF inputs/outputs running through the RF assembly for a plurality of monolithic microwave integrated circuit chips (MMICs) which are located in cavities formed in the RF assembly layer. The module's architecture includes a single transmit/receive RF signal channel that shares its control functions of gain trim, phase shift and intermediate power amplification in both the transmit and receive modes of operation.

In dissipating heat to a heat exchanger, a StackPak T/R module can use only a portion of its front surface for the dissipating heat transfer. Gallium arsenide integrated circuits are normally used for RF power amplification in T/R modules, and the temperature and reliability specifications for these devices require increasing heat dissipation for increasing power rating. Thus, StackPak T/R modules exhibit relatively poor heat dissipation, and consequently, restrict RF power generation, largely because the frontal "real estate" of the T/R module must share heat transfer and electrical connective functions thereby operating with a highly restricted surface area for heat removal.

The StackPak T/R Module has since been improved by the development of the TwinPak® (a trademark of the Northrop Grumman Corporation) T/R module, U.S. application Ser. No. 09/158,829 for "A Dual Channel Microwave Transmit/Receive Module for an Active Aperture of a Radar System."

One major problem encountered by the above-described T/R modules is their inability to dissipate heat away from the circuitry contained within the system. This significantly lowers the performance levels of these devices. Similarly, performance of any electronic or electrical device or circuitry contained within the adhesive layers of the appliqué systems described herein will also be significantly diminished as a results of the build-up of thermal energy or heat. Thus, the ability to dissipate heat from electrical components (including devices such as a T/R module), as well as to lower the surface and bulk temperature of both the appliqué and the underlying substrate (e.g., aircraft or hull, or an ocean or land vessel) are important aspects of this invention.

Accordingly, the present invention relates to the incorporation of a system for cooling objects or devices encapsulated within the appliqué, as well as for cooling or transferring heat from the appliqué composites and/or the underlying substrate to which the appliqué is applied. This can be accomplished using several methods but in general will be provided via the incorporation of thin flat-plate heat pipes, e.g., 36 (FIG. 5b) encapsulated directly between two or more layers of adhesive 14, 32 that comprise one of the layers of the multifunctional oxyfluoropolymer appliqué coating system. The heat pipe system can also be formed by a set of thin metallic rods (not shown) sandwiched or encapsulated within a bi or multilayered adhesive system.

Also contemplated is the inclusion of (within the adhesive system as detailed) a thermoelectric device with enhanced structured interfaces for improved cooling efficiency both of the underlying substrate, as well as the appliqué composite. In one embodiment, the thermoelectric device includes a first thermoelement comprising a superlattice of p-type thermoelectric material and a second thermoelement comprising superlattice of n-type thermoelectric material. The first and second thermoelements are electrically coupled to each other within the adhesive system of the oxyfluoropolymer appliqué composite. The planer surface of the first thermoelement is incorporated within one adhesive layer proximate to, without necessarily being in physical contact with, a first array of electrically conducting tips either within a second adhesive layer, the substrate that is coated with the appliqué, or the appliqué itself at a discrete set of points such that electrical conduction between the planer surface of the first thermoelement and the first array of electrically conducting tips is facilitated while thermal conductivity between the two is retarded. A planer surface of the second thermoelement is likewise encapsulated within a second conductive layer which is proximate to, without necessarily being in physical contact with, a second array of electrically conducting tips at a discrete set of points such that electrical conduction between the electrically conducting tips and the planer surface of the second thermoelement is facilitated while thermal conduction between the two is retarded. The electrically conducting tips are coated with a material that has the same Seebeck coefficient as the material of the nearest layer of the superlattice to the tip. A full description of this thermal management technology is provided in U.S. Pat. No. 6,384,312, the contents of which are incorporated herein by reference.

Other thermal management systems well adapted for inclusion within the adhesive system of this multifunctional appliqué include carbon nano-tubes, polymeric or viscoelastic tubing or metallic duct networks. References to the same include:

Rinzler et al., "Large-Scale Purification of Single-Wall Carbon Nanotubes: Process, Product, and Characterization", Applied Physics A, 1998, pp. 29–37. No month provided. Smalley, Tubes@Rice, http://cnst.rice.edu/tubes/, Apr. 8, 1999, 8 pages.

Http://www.tellurex.com/resource/txfaqc.htm, Aug. 15, 1999, pp. 1–30. "Frequently Asked Questions", Tellurex Corporation.

Http://www.tellurex.com/resource/introc.htm, Aug. 15, 1999, pp. 1–7. "An Introduction to Thermoelectrics", Tellurex Corporation.

Liu et al., "Fullerene Pipes", www.sciencemag.org, Science, vol. 280, May 22, 1998, pp. 1253–1255.

Thess et al., "Crystalline Ropes of Metallic Carbon Nanotubes", Science, vol. 273, Jul. 26, 1996, pp. 483–487.

A further important feature of the appliqués of the invention is the incorporation of miniature sensor devices within the adhesive system, i.e., mechanical/electrical component layer 30 between adhesive layers 14 and 32. This aspect of the invention relates, in general, to Micro Electro-Mechanical System (MEMS) devices, and more particularly, to selective encapsulation of MEMS devices within this adhesive system of the halopolymer appliqués.

MEMS sensors, (i.e. miniature sensors) the size of an integrated circuit, have been introduced into a wide variety of consumer and industrial products that require small devices for sensing a variety of ambient conditions. Perhaps, no current application has a greater potential for the incorporation of MEMS pressure sensors than the outer coating of aerospace, land vehicles and marine vessels. The application requires the embedding of one or more MEMS pressure sensors, equipped with RF transmitters, within the adhesive system of coating systems like the appliqués disclosed herein. These sensors may be fabricated to monitor surface pressure, optical, electrical, thermal and chemical environments, and subsequently, transmit a signal providing a reading to the vehicles processing and display devices.

MEMS are especially well suited to this particular oxyfluoropolymer appliqué technology in that one of the problems currently associated with MEMS sensor technology is stability of the device when subjected to harsh environments. Since the device/sensor is encapsulated within an adhesive that is protected by an outer fluoropolymer film and/or internal corrosion inhibitors, (coupled with thermal dissipation devices when necessary) the survivability of the sensor system is optimized, and can further act synergistically to provide lifecycle information related to both the appliqué and the underlying substrate.

Figure 6:
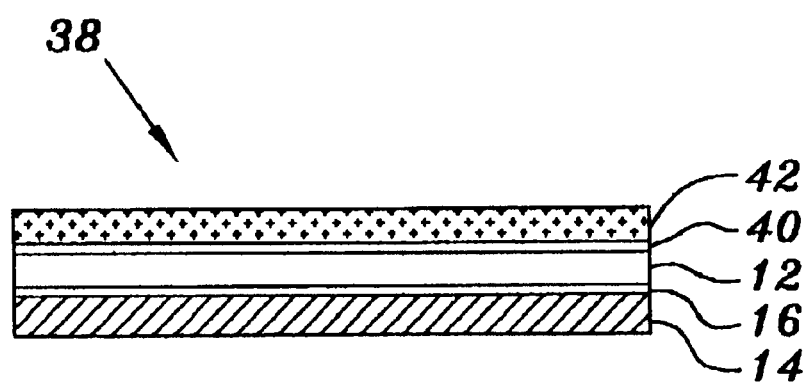
FIG. 6 is an enlarged sectional view of a further embodiment of the invention with additional surface coatings applied to the outer oxyhalopolymeric coating of the basic appliqué of FIG. 1.

A further embodiment of the invention is illustrated by FIG. 6 wherein halopolymer film 16 has been modified on both sides of the film with oxygen or oxygen functionality groups. As previously disclosed, oxyhalopolymer 16 on one side of the halopolymer layer 12 is chemically bonded to adhesive layer 14. Now, in this further embodiment, the opposite side of halopolymer layer 12, the surface 40 has also been modified by the introduction of oxygen or oxygen-containing groups, which are covalently bonded to another material 42. This aspect of the invention relates to the direct bonding of various surface coatings to the outer surface of the oxyfluoropolymer appliqué. Representative outer coatings useful for this invention include polymeric, conducting polymeric, metallic, metal oxides, and semi-conducting metal, metal oxide and metal complexes for optical modification, e.g., U.S. Pat. No. 5,506,053, the contents of which is incorporated herein by-reference; abrasion resistance; enhanced thermal and electrical conductivity; architectural, designing e.g., paint; and anti-graffiti applications.

A method to metallize oxyfluoropolymers with transition metals has been described by T. Koloski and T. Vargo in U.S. Pat. No. 5,703,173 the disclosure of which is incorporated herein by reference.

Briefly, through various liquid and gas/vapor phase chemical reactions, methods are described which provide for metallized polymers comprising transition metal species covalently bonded directly to modified halogenated polymeric supports, e.g., fluoropolymeric, chlorofluoropolymeric, etc., solid substrates. The transition metals are bonded to the oxyhalopolymer surfaces to provide compositions of matter comprising base halogenated polymers with the metals covalently bonded to surface oxygen functionality to depths of approximately 200 Å. The metallized polymers may hereinafter be referred to as metallohalopolymers or "MHPs". Representative MHPs may include the following structural formulas with repeating non-terminal units selected from the group of:

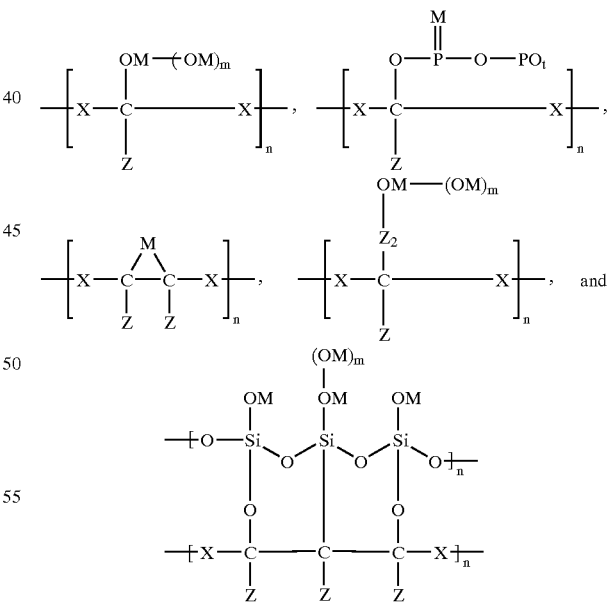

Where M is a transition metal; Z is fluorine, chlorine, hydrogen, $—(CH_2)_y—CH_3$, $—CH_3$ or O—R where R is hydrogen, $—(CH_2)_y—CH_3$ or $—CH_3$ where y is 1 to 20; X is $CF_2$, CFCl, $CCl_2$, CFH, CClH or $CH_2$ and n=10 to 1000, t=2 to 3 and m=0 to 1000.

Generally, the metallohalopolymer side of a oxyhalopolymer substrates may function as a heterogeneous catalyst, an impermeable surface to prevent transfer of gas and vapors, a sensor probe or as an active biocide, i.e., effective in a biological system by demonstrating fungicidal, bactericidal, and viricidal activity. In this regard, the adhesive-oxyhalopolymer composites of this invention may be used in systems for purification of gases and liquids, such as ventilation units in hospitals or water treatment. Essentially, the side of the oxyhalopolymer film chemically bonded to an adhesive may be adhered to a another surface, such as a walls in a hospital operating room while the opposite metallohalopolymer side functions as a biocidal surface.

Alternatively, transition metals which have been bonded to oxygen functionality sites of a oxyhalopolymer surface may act as a crosslinking agent for further bonding with an adhesive material.

In addition to the above methodologies, a halopolymeric material may be selectively oxyhalogenated through the introduction of reactive oxygen sites using known masking and photolithographic techniques. With a template type system, only the exposed or unmasked portions of the halopolymeric support will be oxyhalogenated. Ultimately, the oxyhalogenated portions may be metallized for a patterned effect or chemically bonded to an adhesive.

While not wishing to be held to any specific mechanism of action, it is nevertheless believed that the type and permanent strength of the chemical bond between the oxygen functionality sites and the adhesive material is dependent upon a number of factors including the density of reactive oxygen functionality sites, the lack of reorientation of the covalent bond formed between the carbon backbone and substituted oxygen functionality groups and the specific adhesive.

The type of chemical bond between the oxyhalopolymer and adhesive may be either covalent or ionic depending on the oxygen functionality and/or adhesive material. For example, the reactive oxygen functionality sites on a oxyhalopolymer material act as strong nucleophiles and can readily attack an adhesive having an electrophilic functionality. Specifically, if an adhesive has an $RC(NH_X)_Y$ functionality, the C can react with an oxygen functionality site of the oxyhalopolymer and form a covalent bond between the oxyhalopolymer surface sites and the adhesive. Also, the nature of the oxygen functionality sites on the surface of the halopolymer, such as a —OH functionality, can provide for electrostatic or ionic bonding between an oxyhalopolymer surface and an adhesive that possesses a positive charge. Additionally, the —OH functionality on the oxyhalopolymer can be deprotonated such that the oxyhalopolymer surface will exhibit electronegative functionality which can ionically bond adhesives possessing electropositive character. The method used to modify the halopolymer effectively cleaves only side atoms or groups which are halogens, such as fluorine or chlorine that are bonded onto the basic carbon backbone of the halopolymer. In turn, the hydrogen and oxygen or oxygen functionality groups which replace the halogens are covalently bonded directly to the carbon backbone of the halopolymer. The surface is not damaged, etched or roughened during the process of modifying the halopolymer, and therefore, the newly bonded functional groups on the modified surface are not rearranged over time or lost from the surface. There is essentially no reorientation of the modified surface and this provides for surface reactivity over extended periods of time whether the modified surface is subsequently bonded to an adhesive or not. When the modified halopolymer is contacted with an adhesive material, whether immediately or three years later, a permanent, non-degrading bond is formed between the oxygen or oxygen functionality groups and the adhesive material. This is contrary to other methods which etch the surface and merely destroy the fluorinated surface functionality which may initially increase surface reactivity, due to free radical sites, but only for a limited time. As a result of etching the surface, the modified surface is not permanent due to reorientation of the surface polymer chains in an attempt to lower surface energy to a more favorable energy state. Moreover, the etched surface is highly vulnerable to degradation under various environmental conditions, such as temperature extremes, humidity and ultraviolet radiation.

The adhesive-oxyhalopolymer composites may be prepared in varying thickness and may be transparent, colored or opaque, have various densities, UV absorbing properties, broad band electromagnetic shielding reflectivity or conductivity characteristics and can be doped with flame retardants, smoke retardants, anti-static compounds or any other useful bulk modifiers. Additionally, the adhesive-oxyhalopolymer composites can have varying mechanical strengths which are dependent upon the starting halopolymer and specific properties of the adhesives.

Additionally, U.S. Pat. No. 6,410,646 discloses scratch resistant coatings also well suited for application directly to the halopolymer modified surfaces or treated to produce oxyhalopolymer reactive properties.

Figure 7:
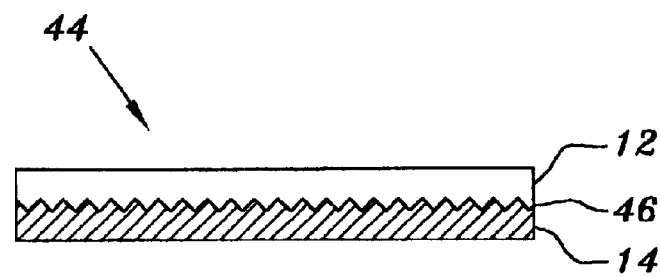
FIG. 7 is an enlarged sectional view of an alternative embodiment of the basic two layer appliqué of FIG. 1 wherein the inner contact surface of the oxyhalopolymer is roughened for better bonding between the modified halopolymer surface and the adhesive coating.

As a further embodiment, this invention also contemplates inducing physical changes to the adhesive side of appliqué 44, as illustrated by FIG. 7 of halopolymer film layer 12 in order to increase the multifunctionality of the appliqué system. For example, roughening 46 of the base halopolymer on the side that the adhesive 14 will be applied once conversion to the oxyhalopolymer surface is effected will increase the effective surface area in order to facilitate better bonding. In addition, controlled roughening that produces well defined patterns or specific surface topography can also be used to systematically control optical dispersion qualities of the appliqué film (i.e., gloss, glare, reflectivity).

Surface roughening can be facilitated in a variety of ways. Simple running the film over a rough abrasive surface (e.g., a sand paper lined roller) can provide controlled topographical changes. Additionally, the material comprising the rollers in which the halopolymer resin is extruded onto (i.e. film conversion process) will also control surface finish. For example, Westlake Plastics currently offers commercial halopolymers having both a gloss finish and a flat matte finish. The gloss surface is produced using a stainless steel roller and the matte finish is produced by extruding onto a hard rubber roller.

Figure 8:
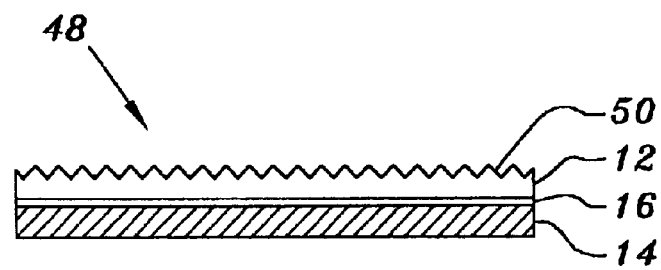
FIG. 8 is an enlarged sectional view of an alternative embodiment of the basic two layer appliqué system of FIG. 1 wherein the outer oxyhalopolymer surface is embossed or textured.
Figure 9:
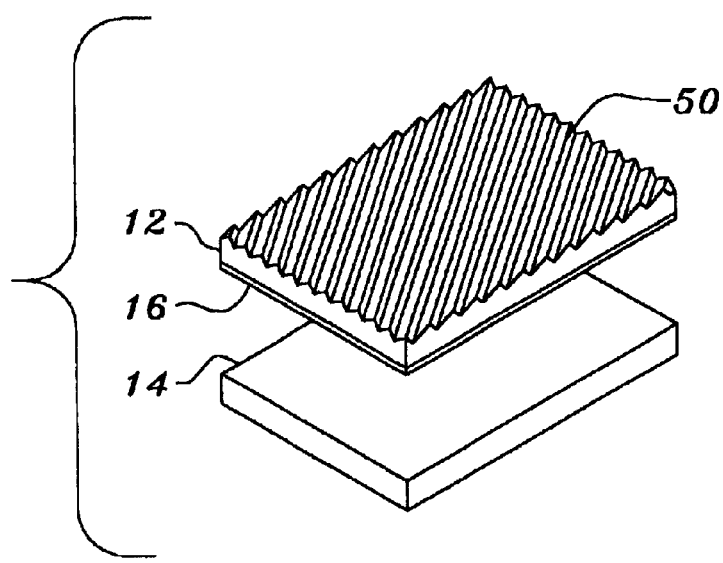
FIG. 9 is an exploded isometric view of the embodiment of FIG. 8 wherein the ribbed surface features on the outer polymer coating are made more visible.

An alternative embodiment of this inventive concept is illustrated by FIGS. 8 and 9, wherein the outer surface of the halopolymer layer 12 of appliqué 48 has a roughened surface 50 for achieving the same desired surface area increase and/or for changing the optical dispersion characteristics to provide anti-glare or glint characteristics via random roughening or engineered roughening for directional control of glint and glare.

Furthermore, the embodiment of FIGS. 8–9 can also incorporate physical surface features that enhance or minimize drag resistance e.g., through the formation of riblets or grooves for minimization of air or water drag. It is well known that aerodynamic drag of a surface may be reduced by applying a microscopic "texture" to the otherwise smooth surface, See, for example, U.S. Pat. No. 6,345,791. Although the exact fluid dynamic mechanism at work in this drag reduction is not fully understood, it is believed that drag reduction relates to controlling the turbulent vortices in the boundary layer adjacent to the surface. The microscopic texture reduces the skin friction drag of solids moving through fluids (e.g., aircraft, ships, cars, etc.), and of fluids moving along solids (e.g., pipe flow, etc.). Although the practical use of such texturing has been limited, one well-known exception has been the application of a texture to the racing yacht, Stars and Stripes.

The geometric form for the microscopic, friction-reducing texture is known as "riblets," which are typically an integrated series of groove-like peaks and valleys with V-shaped cross-sections 50, especially well shown by FIG. 9. Riblets always extend along the aerodynamic surface in the direction of fluid or air flow. The height of the riblets and the spacing between the riblets are usually uniform and on the order of 0.001 to 0.01 inches for most applications. Dimensionless units, sometimes referred to as wall units, are conventionally utilized in describing fluid flows of this type. The wall unit h+ is the non-dimensional distance away from the wetted surface or more precisely in the direction normal to the surface, extending into the fluid or air. Thus h+ is a non-dimensional measurement of the height of the riblets. The wall unit s+ is the non-dimensional distance tangent to the local surface and perpendicular to the flow direction, thus the non-dimensional distance between the riblets. In the prior art riblets, h+ and s+ are in the range between 10 and 20. Previous riblet designs consisted of an adhesive film applied to a smooth solid surface. However, with advanced manufacturing techniques, the same shapes may be directly formed and integrated into the structure of the multifunctional appliqués described within herein.

The interaction of riblets with the structure of the turbulent boundary layer of the fluid or air reduces the skin friction drag coefficient (Cdf) of the surface by approximately 6% compared to an identical smooth surface without riblets. This reduction occurs despite the significant increase in "wetted area" (the surface area exposed to the fluid stream) of a riblet-covered surface over a smooth surface. In attempts to further reduce the Cdf, modifications to conventional V-shaped riblets have been proposed. Examples include rounding of the peaks and/or valleys, as well as even smaller V-shaped notches in the sides of the larger V-shaped riblets. In summary, any changes in surface texturing or the addition of a riblet design to the outer side of the oxyfluoropolymer appliqué would add benefit to the appliqué in applications that demonstrate improved performance based on controlled increase or decrease in laminar flow of fluids.

In general, the surface reactivity of the oxyfluoropolymer materials has been well identified for bonding adhesives, metals, inorganic including films comprised of semiconductors, and organic materials including polymers and conducting polymers. Thus, although this invention requires that one side of the oxyhalopolymer be directly bonded to an adhesive additional functionality can be added to the appliqué coating system by bonding other materials directly to the outer surface of the oxyfluoropolymer as described.

The following examples demonstrate preferred embodiments of the invention, however, it is to be understood that these examples are for illustrative purpose only, and do not purport to be wholly definitive as to conditions and scope.

EXAMPLE 1

Peel Strength Test

To demonstrate the bond strength of the adhesive-oxyhalopolymer composites of this invention and specifically the bond between the oxyhalopolymer material and the adhesive material, peel strength testing was conducted on several samples of commercially available fluoropolymer films. All test composite films were between 4 and 24 mils thick. The fluoropolymers were first modified by a plasma chemistry treatment process (not plasma etching) in which the fluoropolymer films were exposed to a series of glow discharges according to the methods of J. Gardella and T. G. Vargo in U.S. Pat. Nos. 4,946,903 and 5,627,079 the disclosures of which are incorporated herein by reference.

Briefly, the oxyfluoropolymers were prepared by using radio frequency glow discharge (RFGD) in a plasma chamber at pressure vacuums under 1,000 mTorr and having a maximum output of 1000 watts. The starting fluoropolymer film was placed in the plasma reaction chamber and exposed for about 1 to about 20 minutes at about 1000 watts to a gas/vapor RFGD plasma mixture consisting of about 40 to about 80 percent by volume of hydrogen and about 20 to about 60 percent methanol at about 130 mTorr pressure. The plasma treated film had up to 98 percent, and more specifically, from about 20 to about 85 percent of the surface halogen atoms of the oxyhalopolymer material permanently substituted with hydrogen and oxygen and/or oxygen-containing groups of which from about 3 to about 30 percent of the substituted halogen atoms were replaced with oxygen or oxygen-containing groups and from about 70 to about 97 percent of the substituted halogens were replaced with hydrogen atoms. The exact amount of hydrogen, halogen and oxygen or oxygen containing functional groups depends on several variables, such as the type of polymer, the thickness of same and resident time of exposure to the plasma gas/vapor mixtures used in the present invention. It has been discovered that there is an optimal time of exposure to the plasma gas/vapor mixtures for each type of polymer to provide the optimal level of controlled modification and without damaging or etching the surface of the polymer. The halogens were replaced to depths from about 10 to about 100 Å. However, the morphological properties and bulk properties of the oxyhalogenated surface remained substantially unchanged over the starting bulk halopolymer material.

The modified oxyfluoropolymer films were stored for at least three months under ambient conditions and then laminated with pressure sensitive film adhesives (PSA). After the lamination process the adhesive-oxyhalopolymer composites were stored for an additional three months under ambient conditions. The oxyfluoropolymer films were laminated with acrylic and silicone based PSA. These two types of adhesive were chosen specifically because of their inherent qualities. It is well known in the art that silicone does not display aggressive adhesion and exhibits lower peel strength values, but does display excellent chemical resistance and withstands higher temperatures. On the other hand, acrylic based adhesives display greater adhesion and this is exhibited by higher peel strength values. The acrylic has excellent chemical resistance but displays decreased temperature resistance.

The films were mounted on standard 32 mil, 4"×6" matted carbon steel test plaques (Q-Panel R-46). The films were cut to size as specified in ASTM D 903-93 (Adhesive Pull), applied at room temperature with vigorous thumb pressure and allowed to adhere overnight prior to testing.

The average values for ten samples of each film pulled at 0° C., 23° C. and 60° C. are presented below.

TABLE I

| Plasma | | | | Total | Peel Strength (oz./in.) | | |
|---|---|---|---|---|---|---|---|
| Film | Mil | Adhesive | Mil | Mil | 0° C. | 23° C. | 60° C. |
| PTFE (skived#) | 2 | Acrylic | 4 | 6 | 26.2 | 163.2* | 21.6* |
| MFA | 2 | Silicone | 2 | 4 | 50.0 | 33.1 | 23.2 |

TABLE I-continued

| Plasma Film | Mil | Adhesive | Mil | Total Mil | Peel Strength (oz./in.) 0° C. | 23° C. | 60° C. |
|---|---|---|---|---|---|---|---|
| MFA | 2 | Acrylic | 4 | 6 | 86.0 | 140.3* | 29.8* |
| MFA | 10 | Acrylic | 4 | 14 | 133.3 | 157.4* | 56.0 |
| MFA | 20 | Acrylic | 4 | 24 | 168.3 | 136.0 | 62.6 |
| ECTFE | 2 | Acrylic | 4 | 6 | 98.9 | 249.6* | 32.2* |
| ECTFE | 10 | Acrylic | 4 | 14 | 184.0 | 256.0 | 69.8 |
| PCTFE | 2 | Acrylic | 4 | 6 | 110.7 | 225.6* | 26.2* |

*film tear, stretch (i.e. sample ripped in half or elongated prior to pulling free-actual value is higher than reported)
skived is a film type prepared by shaving a large cylinder of solidified polymeric material
MFA: is a perfluoroalkoxy-substituted fluoropolymer available from Ausimont USA, Thoroughfare, New Jersey
PTFE is polytetrafluoroethylene
ECTFE is ethylenechlorotrifluoroethylene
PCTFE is polychlorotrifluoroethylene Representing the current state of the art, commercially available peel data for Teflon® films (trademark of DUPONT) was compared to the test results shown above in Table I. The Teflon® film had been modified with an etching process to prepare a modified film that was defluorinated with some surface oxygen functionality groups. It was subsequently laminated with both silicone and acrylic pressure sensitive adhesives. The testing results for Teflon® film are shown in Table II.

TABLE II

| Etched Film + | Mil | Adhesive | Mil | Total Mil | Peel Strength (oz./in.) 0° C. | 23° C. | 60° C. |
|---|---|---|---|---|---|---|---|
| PTFE (Teflon) High Modulus | 1.5 | Silicone | 3 | 4.5 | NA | 30.0 | NA |
| PTFE (Teflon) High Modulus | 1.5 | Silicone | 5 | 6.5 | NA | 45.0 | NA |
| PTFE (Teflon) High Modulus | 1.5 | Acrylic | 2 | 3.5 | NA | 35.0 | NA |
| PTFE (Teflon) High Modulus | 1.5 | Acrylic | 5 | 6.5 | NA | 45.0 | NA |
| PTFE (Teflon) Skived | 1.5 | Silicone | 3 | 4.5 | NA | 30.0 | NA |
| PTFE (Teflon) Skived | 1.5 | Silicone | 10 | 11.5 | NA | 45.0 | NA |
| PTFE (Teflon) Skived | 1.5 | Acrylic | 10 | 11.5 | NA | 55.0 | NA |

+ Commercially available information

A comparison between the adhesive-oxyhalopolymer composites of the present invention and the commercially available etched films clearly shows and proves that the adhesive-oxyhalopolymer composites having a chemical bond between the oxyhalopolymer and adhesive material exhibit unexpected increased bond strengths. As stated earlier, it is believed that the chemical plasma treating of the halopolymer's surface, for an optimal period of time, provides for an undamaged and unetched surface which eliminates rearrangement of the functionality groups which are covalently bonded onto the surface of the oxyhalopolymer.

Specifically, when a comparison is made between the adhesive-oxyhalopolymers composites of the present invention (PTFE/acrylic) and the prior art etched film (PTFE/acrylic), it is evident that the peel strength of the etched film is about 45 oz./in. while the present invention has a peel strength of about 163.2 oz./in. which is more than 3 times higher.

| Film | Mil | Adhesive | Mil | Total Mil | Peel Strength oz./in. 0° C. | 23° C. | 60° C. |
|---|---|---|---|---|---|---|---|
| PTFE High Modulus Present Invention | 1.5 | Acrylic | 5 | 6.5 | N/A | 45.0 | N/A |
| PTFE (skived) | 2 | Acrylic | 4 | 6 | 26.2 | 163.2* | 21.6* |

*film tear, stretch (i.e. sample ripped in half or elongated prior to pulling free-actual value is higher than reported)

As stated earlier, silicone adhesive displays low tack/adhesion, but high temperature resistance. In contrast, acrylic adhesive is a more tacky and aggressive adhesive with lower temperature resistance. Accordingly, acrylic peel strength values should be higher than silicone peel strength values if the separation is occurring at the test plaque/adhesive interface. However, if the peel strength values are approximately the same then the failure of a bond is more likely occurring at the film/adhesive interface bond. When examining the spread in the etched films of the same polymer and thickness, whether laminated with silicone or acrylic, it is apparent that there is very little difference in the peel strength values.

| Etched Film + | Mil | Adhesive | Mil | Total Mil | Peel Strength (oz./in.) 0° C. | 23° C. | 60° C. |
|---|---|---|---|---|---|---|---|
| PTFE High Modulus | 1.5 | Silicon | 5 | 6.5 | NA | 45.0 | NA |
| PTFE High Modulus | 1.5 | Acrylic | 5 | 6.5 | NA | 45.0 | NA |

The low value of 45.0 oz./in. for the silicon adhesive may be merely separation of the adhesive/test plaque bond, but the acrylic adhesive should show a much higher peel strength value because it is a much more aggressive adhesive. The results above demonstrate that the etched products did not allow the specific adhesive to maximize its expected performance. Instead, the results indicate that in at least the acrylic adhesive test, the etched film/adhesive bond gave way before the testing plaque/adhesive bond.

In contrast, the adhesive-oxyhalopolymer composites allowed the adhesive materials to perform to expected adhesion specifications and it was found that when there was bond breakage, it was between the adhesive and test plaque and not between the oxyhalopolymer and adhesive. In Table I (data from the composites of the present invention) it is shown that MFA/acrylic has a much higher peel value than MFA/silicone, namely, 140.3 oz./in. vs. 33.1 oz./in. This is evidence that failure of the bond between the adhesive and testing plaque was the determining factor in the peel strength values and the resulting data was dependent upon the aggressiveness of the individual adhesives.

The testing results also show that even though the modified films were stored for approximately six months before testing there was no loss of surface reactivity and the functionality sites on the surface had not rearranged during the period of storage.

EXAMPLE 2
Temperature Shock/Cycling

A roll of MFA film (10 mil, 12'×100') that had been previously modified and laminated for testing in Example 1 was used in this testing regime. The roll of MFA had been laminated with a silicone based pressure sensitive adhesive. MFA has an advertised continuous operating temperature of about 246° C., and the silicone adhesive has an advertised continuous operating temperature of about 260° C. Three sample were cut from this roll with each sample being about 1"×2". These samples together with three 32 mil matted carbon steel test plaques, were exposed to the following temperatures for 12 hours to insure optimal adhesion of the adhesive to the test panel:

| Adhesive-Oxyfluoropolymer Composites | Temperature (degrees C.) |
| --- | --- |
| Sample A | 10 |
| Sample B | 21.1 |
| Sample C | 21.1 |

One 2 mil piece (1"×2") of commercially available etched PTFE (skived) was laminated with 3 mils of silicone pressure sensitive adhesive. PTFE has an advertised continuous operating temperature of 260–274° C. and the silicone adhesive has an advertised operating temperature of about 260° C. The sample together with a 32 mil matted carbon steel test plaque were exposed to the following temperature for 12 hours to insure optimal adhesion of the adhesive to the test panel:

| Etched Film Composites | Temperature (degrees C.) |
| --- | --- |
| Sample D | 21.1 |

After 12 hours all the adhesive/film samples were applied with vigorous thumb pressure to their respective test plaques and immediately cycled under the following conditions:

| Temperature (° C.) | Dwell Time (minutes) |
| --- | --- |
| 246 | 15 |
| −19 | 15 |

The samples were cycled eight times wherein each cycle involved 15 min. at 246° C. and 15 min. at −19° C. Samples were placed in the center of both an oven and freezer to allow for rapid heating and cooling of all surfaces. There was no pause between moving the samples from the different temperature extremes, except for the time required for physical movement. After completing eight full cycles the samples were allowed to equilibrate to room temperature. The following results were found when the samples were inspected:

The samples of the present invention, that being samples A, B, and C all remained bonded to the test plaques with no edge curl of the film. Adhesion was excellent, i.e., the same as when first applied and qualitatively determined by hand.

Etched sample D displayed significant edge and corner curl of the film at the conclusion of the second complete cycle with about 25% of the film peeling away from the adhesive. The sample was removed from cycling at this point to inspect adhesion. Approximately 75% of the remaining film was still adhered to the test plaque. The sample was not returned to cycling.

This temperature stress testing regime demonstrated that the adhesive-oxyfluoropolymer composites of the present invention showed no loss of adhesion even under extreme temperature stress and could theoretically be cycled indefinitely. The commercially available etched film did not perform well under thermal stress as evidenced by significant corner peel after only a few stress cycles. Since the PTFE, MFA and silicone adhesive are all rated to operate under these temperatures, the reasoning for the peel curl in the etched film sample must be due to the bond release between the etched film and the adhesive and not bond release between the adhesive material and test plaque. It was noted in the failed etched film sample that the adhesive material was still adhering to the test plaque and that the etched film had separated from the adhesive material. In contrast, the adhesive-oxyhalopolymer composite samples of the present invention maintained a strong chemical bond between the oxyhalopolymer and adhesive in addition to the bond between the adhesive and test plaque.

EXAMPLE 3
Ultraviolet Exposure

The object of this test was to determine the durability of the bond between the adhesive and the oxyhalopolymer after exposure to extreme UV radiation, temperature and humidity conditions. It is well known in the art that these extreme conditions rapidly degrade the adhesive/film bond in both etched and corona treated fluoropolymer films.

Several samples of differing sizes were cut from rolls of plasma treated fluoropolymer films that had been treated and laminated for testing in Example 1. The samples had been modified on both sides of the film to introduce two-sided reactivity and/or bondability. The films were then laminated on one side with either 4 mil of acrylic pressure sensitive adhesive or 2 mil of silicone pressure sensitive adhesive.

The samples were mounted with vigorous thumb pressure in overlapping layers onto 32 mil matted carbon steel test plaques, i.e., wrapped, layered onto the steel and additionally onto itself (adhesive side to non-adhesive side). Samples tested and configuration of wrapping are shown below in Table III.

TABLE III

| Plasma Film | Mil | Adhesive | Mil | Total Mil | Configuration |
| --- | --- | --- | --- | --- | --- |
| MFA | 2 | Acrylic | 4 | 6 | Overlapping strips |
| MFA | 2 | Silicone | 2 | 4 | Overlapping strips |
| MFA | 10 | Acrylic | 4 | 14 | Overlapping strips |
| MFA | 20 | Acrylic | 4 | 24 | Overlapping strips |
| ECTFE | 2 | Acrylic | 4 | 6 | Overlapping strips |
| ECTFE | 10 | Acrylic | 4 | 14 | Overlapping strips |
| ECTFE | 2 | Acrylic | 4 | 6 | Panel wrapped |
| MFA | 2 | Silicone | 2 | 4 | Panel wrapped |
| PCTFE | 2 | Acrylic | 4 | 6 | Overlapping strips |

The test plaques with the adhering films were exposed to the following conditions per ASTM G53-96: Duration 169 hours, UVB-313 Lamp @ 0.63 W/m², alternate cycles of 4 hours UV at 60° C. with 4 hours condensation at 50° C.

Inspection of the test plaques showed some expected discoloration of the adhesives, but the chemical bond between the oxyfluoropolymer and the adhesive was not compromised nor was adhesion to the test plaque. Moreover, there was no evidence of edge/corner peeling even in areas of overlapping. In fact, random samples where chosen and the film was forcefully peeled back in order to ascertain the condition of the adhesive post-exposure. In all instances, the adhesive remained bonded to the film and pulled cleanly from the test plaque.

EXAMPLE 4

Nitric Acid Immersion

The object of this testing was to determine the durability of the bond between the oxyhalopolymer and adhesive material. Moreover, to determine if the adhesive-oxyhalopolymer composites can protect surfaces from corrosion due to acid attack. Still further to show that the modifying treatment according to the method of Example 1 has no effect on the chemical resistance on either side of the oxyhalopolymer film.

Several samples of differing sizes were cut from rolls of plasma treated fluoropolymer films that had been previously modified, laminated and stored for testing in Example 1. The samples had been modified on both sides of the film to introduce two-sided reactivity and laminated on one side with either 4 mil of acrylic pressure sensitive adhesive or 2 mil of silicone pressure sensitive adhesive.

The samples, for this testing regime, were mounted with vigorous thumb pressure in overlapping layers onto 32 mil matted carbon steel test plaques, i.e., wrapped or layered onto the steel and additionally onto itself (adhesive side to non-adhesive side). Types of film samples and configuration of film placement are outlined below in Table IV.

TABLE IV

| Plasma Film | Mil | Adhesive | Mil | Total Mil | Configuration |
|---|---|---|---|---|---|
| MFA | 2 | Acrylic | 4 | 6 | Overlapping strips |
| MFA | 2 | Silicone | 2 | 4 | Overlapping strips |
| MFA | 10 | Acrylic | 4 | 14 | 3 layers in pyramid |
| MFA | 20 | Acrylic | 4 | 24 | 3 layers in pyramid |
| ECTFE | 2 | Acrylic | 4 | 6 | 3 layers in pyramid |
| ECTFE | 10 | Acrylic | 4 | 14 | 3 layers in pyramid |
| ECTFE | 2 | Acrylic | 4 | 6 | Panel wrapped |
| MFA | 2 | Silicone | 2 | 4 | Panel wrapped |
| MFA | 10 | Acrylic | 4 | 14 | Panel wrapped |
| PCTFE | 2 | Acrylic | 4 | 6 | Overlapping strips |

The test plaques with the adhering film were completely immersed in 2N (10%) Nitric Acid/water solution at 23° C. having a pH of less than 1.0.

The results demonstrate that adhesion to the test plaque was not affected by this harsh acidic environment because none of the samples displayed any edge/corner peel back.

The double-sided plasma treatment had no deleterious impact on the film's ability to resist chemical attack. This further supports the claim that the modification method has no noticeable impact on the bulk or surface properties of the starting fluoropolymer, aside from introducing the ability to chemically bond to an adhesive which is the subject of this invention.

The samples had to be removed from the nitric acid after 5 hours because the carbon steel test plaques, in all the uncoated areas, including the side of the plaque that was not covered, were almost completely dissolved and/or corroded by the acid. All regions under the adhesive-oxyfluoropolymer composites were completely protected from attack and revealed virgin, shiny and uncorroded steel. Only one sample showed any attack at the edges, and this was reserved to an isolated region at one edge which did not undercut the film much more than $\frac{1}{16}$".

It was observed that the test plaques wrapped in thick 10 and 20 mil film did have a few channels that were exposed to the acid because it was difficult to wrap the film around the test plaques due to the modulus of the film. The channel regions of these test plaques that were exposed to the acid did show some corrosion of the steel, but there was no corrosion adjacent to the channels where the film was firmly bonded to the steel. In no sample did the film peel back. Furthermore, the bonds, both adhesive/test plaque and oxyfluoropolymer/adhesive, survived in an environment which quickly corroded the steel. All the wrapped or layered test plaques showed no curling of edges or release of adhesion in areas where the adhesive-oxyhalopolymer composite bonded to itself which is further indication of the unexpected superior and permanent bond strength.

EXAMPLE 5

Additional testing was conducted to demonstrate the bond strength between an oxyhalopolymer and adhesive material. Several film samples of different halopolymers of 2 mil thickness, including MFA, ECTFE and PCTFE were chemically plasma treated according to Example 1.

The oxyfluoropolymer films were laminated with a rubber pressure sensitive film adhesive (PSA). The rubber PSA material A (8 mil) and B (6 mil) were laminated to the oxyfluoropolymer films at room temperature using appropriate pressure to secure the adhesive to the film. The samples were laid onto and adhered to either a smooth polypropylene or polished stainless steel test plaque. The test strips of the adhesive-oxyhalopolymer composites were subjected to a pull rate of 12"/min with load ranging from about 1 to about 15 psi according to Pressure Sensitive Tape Council (PSTC) conditions. Surprisingly, it was found that the chemical bond between the PSA adhesive material and oxyfluoropolymeric film showed extraordinary strength even at temperatures as high as 82.2° C. which is the upper optimum operating temperature for these rubber adhesives. The data in Table V and Table VI show the numerical test results substantiating the surprisingly and unexpected bond strengths between the PSA adhesive material and oxygen or oxygen functionality groups on the surface of the oxyfluoropolymeric films treated according to the methods of the present invention. More important, any failure that did develop routinely occurred by a weakened bond between the PSA and the test plaques of smooth polypropylene (PP) and polished stainless steel (SS) and not between the PSA and oxyfluoropolymer film verifying the strength of the bond between the oxyfluoropolymer film and adhesive. The results show consistent and superior bonding strength indicating a strong and permanent chemical bond between the oxygen or oxygen-containing functionality sites of the chosen halopolymers films and adhesive material.

TABLE V

SUBSTRATE - SMOOTH POLYPROPYLENE

| MODIFIED FILM TYPE | ADHESIVE | TEST TEMP (° C.) | RESULTS (oz/in) |
|---|---|---|---|
| MFA# | A | 21.1 | 129.6FT** |
|  |  | 82.2 | 68.8 AFP |
|  | B | 21.1 | 134.4 FT |
|  |  | 82.2 | 54.4 AFP |
| PTFE | A | 21.1 | 49.6 AFP |
|  |  | 82.2 | 46.4 AFP |
|  | B | 21.1 | 46.4 AFF |
|  |  | 82.2 | 32.0 AFP |
| ECTFE | A | 21.1 | 57.6 AFP |
|  |  | 82.2 | 65.5 AFP |
|  | B | 21.1 | 100.8 CF |
|  |  | 82.2 | 54.4 AFP |

TABLE VI

SUBSTRATE - POLISHED 304 STAINLESS STEEL

| MODIFIED FILM TYPE | ADHESIVE | TEST TEMP (° C.) | RESULTS (oz/in) |
|---|---|---|---|
| MFA | A | 21.1 | 152.0 FT |
|  |  | 82.2 | 67.2 AFP |
|  | B | 21.1 | 128.0 FT |
|  |  | 82.2 | 59.2 AFP |
| PTFE | A | 21.1 | 152.0 FT/AFP |
|  |  | 82.2 | 57.6 AFP |
|  | B | 21.1 | 123.2 FT |
|  |  | 82.2 | 38.4 AFP |
| ECTFE | A | 21.1 | 163.2 AFP |
|  |  | 82.2 | 68.8 AFP |
|  | B | 21.1 | 196.8 AFP |
|  |  | 82.2 | 41.6 AFP |

** AFF: Adhesive Failure Film - The adhesive adhered to the polypropylene and stainless steel and the film was stripped away cleanly.
AFP: Adhesive Failure Plaque - The adhesive stayed attached to the film and this laminate was removed cleanly from the test plaque of PP or SS.
FT: Film Tear - Here there was no peel at all. The film broke in tensile immediately before any peel could occur.
CF: Cohesive Failure - Here the adhesive was torn apart with basically equal amounts on the film and on the test plaque.
MFA: is a perfluoroalkoxy-substituted fluoropolymer available from Ausimont USA, Thoroughfare, New Jersey In the following Examples several appliqués of this invention were fabricated from halopolymers purchased from commercial sources. Table VII lists several representative halopolymers and process conditions for creating oxyhalopolymer surfaces and measured surface energies. Each halopolymer had a different exposure time in order to produce the resultant oxyhalopolymer. Also, the oxyhalopolymers listed in Example 6 and in the subsequent Examples are representative of the oxyhalopolymers used in fabricating the appliqués in conducting experiments within this disclosure.

All of the halopolymers were purchased on rolls that were between 24 inches and 60 inches wide and several hundred to several thousand feet long. The rolls were placed into a large vacuum chamber that had 60 inch, reel to reel, roll transfer capability coupled with several plates that were electronically controlled in order to capacitively couple and subsequently induce a low temperature radio frequency glow discharge plasma. In addition, the machine as described contained input regulators that allowed control of both the operating pressure of the plasma as well as the concentration and/or mixture of gases used to create the plasma. For the following Example, a 55:45 ratio of hydrogen:methanol was used at a target pressure of 110 mT. In practice we first determined the flow rate (sccm) of hydrogen that was required to attain 110 mT after first evacuating the treatment chamber to ca. 10–20 mT. We then set the $H_2$ flow to 55% of that value which is typically 480 sccm. Methanol ($H_2O$ can be substituted) was then injected into the gas stream using a volumetric pump to increase the pressure to 110 mT. The oxyhalopolymer surface energies were then checked using commercially available Dyne testing pens and the results are listed in Table VII. In general, the oxyfluoropolymer treatment can be used to treat various halopolymers in order to achieve a range of surface energies from 45 dyne cm or higher.

TABLE VII

| Halopolymer | Plasma Exposure Time | Surface energy (Dynes) |
|---|---|---|
| PTFE | 5 min | 45–55 dynes |
| PFA | 5 min | 55–60 dynes |
| MFA | 5 min | 55–60 dynes |
| FEP | 5 min | 55–60 dynes |
| ETFE | 3 min | 60–65 dynes |
| ECTFE | 3 min | 60–65 dynes |
| PVDF | 2 min | 60–65 dynes |

Note:
although surface energies are listed within a 10 dyne range, the exposure times can be modified to increase surface energy or decrease surface energy. The measured surface energy is a qualitative measurement used to systematically reproduce treatment levels that are optimized for the bonding characteristics desired. Unlike other halopolymer modification techniques, bonding and/or adhesion to oxyfluoropolymers does not necessarily increase with surface energy. The ratio of fluorine to oxygen functionality is critical depending on the material one desires to bond. For example, metals, adhesives, metal oxides, metal nitrides, metal sulfides, metal carbides and semiconductors like GaAs all have different bonding mechanisms and require different oxyhalopolymer surface treatments for optimal bonding performance. The values and treatments listed above in Table VII are illustrative of treatments used for bonding acrylic and silicone pressures sensitive adhesives described within the various Examples contained within this disclosure. Bonding of other materials to oxyfluoropolymers (e.g., metals, semiconductors, other adhesives systems) often requires changes in the treatment times, treatment pressures and gas mixtures used to create the RF plasma.

EXAMPLE 6

Aircraft Appliqué

The present invention also pertains to a paintless system for replacing conventional paints on metal or composite aerospace parts, assemblies, structures, hulls and wings. Such a system is useful for providing multifunctional characteristics, such as corrosion protection, protection from electromagnetic environmental effects (e.g., lightning strikes), as well as decorative additives, mechanical/structural enhancements.

Fabrication of Paint Replacement Films and Appliqués

Two different fluoropolymer appliqué materials were evaluated, namely a 2-mil MFA fluoropolymer with a 4-mil acrylic pressures sensitive adhesive and a 3-mil ECTFE fluoropolymer having a 2-mil acrylic pressure sensitive adhesive. Additionally, the 3 mil ECTFE fluoropolymer appliqué was extruded with pigments in order to provide a material having a gray color as per Federal Color Code standard 595B (gray color=36320) and this appliqué was tested using two different acrylic based adhesives having a corrosion inhibitor added. These adhesives are referred to as TRI 39-3 and TRI 45-1.

All base fluoropolymer materials were treated using the surface modification process described hereinabove, and were then subsequently laminated with ADCHEM 747 acrylic adhesive or two different modified acrylate copolymer systems containing an organic (amine based) corrosion inhibitor(referred to as 39-3 or 45-1 in the Tables). Tensile strength and elongation tests were performed on each fluoropolymer material and test coupons were prepared as described below. These films were also tested for adhesion under: (1) a range of temperatures between –65° F. through 350° F., (2) UV radiation, (3) Immersion in Hydraulic Fluid MIL-H-23699, (4) Engine Lube Oil MIL-I-7808, (5) Synthetic Hydraulic Fluid MIL-H-83282, (6) JP-8 Jet fuel, (7) Cleaning Solvents MIL-C-38738 Type II, (8) Deicing Fluid UCAR "50/50" SAE/ISO Type 1, and (9) 5% Aqueous Cleaning Detergent.

Sample Preparation
Adhesion Testing
1. Test coupon surface preparation:
   aluminum 2024-T QQ-A-250/4-T3, thickness T=0.071"
   Test coupons were 1"×12"×0.071" and were thoroughly cleaned using alkaline cleaner with Scotch Brite® (per Mil-C-87937).
   Test coupons were chem.-filmed according to application spec Mil-C-5541 (the material used to prepare chem.-film solution conformed to Mil-C 81760, class 3, form II) and air dried.
   Test coupons were then primed with water reducible, low density, epoxy primer Mil-PRF-85582C or DEFT 44-GN-36 to a dry thickness of 0.8 to 1.2 mils. Primer was then cured at RT for at least 10 hours.
2. Application of Candidate Appliqué
   Test panels were scuff sand primed with sand paper grit 220 or finer to remove the gloss, and then cleaned with cheesecloth moistened with isopropyl alcohol, followed by cleaning with dry cheesecloth.
   Appliqué films were then applied according to PSTC-1.
3. Adhesion Testing:
   All tests were performed per PSTC-1, 3 coupons per temperature or condition at room temp., 250° F., 350° F. and −65° F.
4. QUV Weatherometer Tests:
   All tests were performed for 30 days with cycling as follows: exposure to UVA source for 17 minutes followed by exposure to a 3 minute water spray cycle at 60° C.
5. Fluid Resistance:
   Test coupons were totally immersed in test fluids and/or soaked cheesecloth. Coupons were adhesion tested after 7 days and also 14 days. Test values were recorded at not less than 10% of room temperature requirement. Appliqués were inspected for any sign of degradation or softening. Test fluids included:
   Hydraulic fluid Mil-H-23699
   Synthetic hydraulic fluid Mil-H-83282
   Engine lube oil Mil-l-7808
   JP-5 jet fuel
   Cleaning Solvents MIL-C-38738 Type II
   Deicing Fluid UCAR "50/50" SAE/ISO Type 1
   5% Aqueous Cleaning Detergent
6. Temperature stability:
   Appliqué system was exposed to the following temperature ranges:
   180° F. to 200° F.
   200° F. to 250° F.
   250° F. to 300° F.
   300° F. to 350° F.
   The appliqués were inspected for signs of curling, melting or degradation. Candidate samples (3"×3") were applied onto clean aluminum panel. After exposure, candidate samples were then peeled (hand pressure). Test results are reported as: ease of removing sample from substrate, film tore upon removal, cohesive adhesive, estimate of the amount of adhesive left on substrate (for example: 100% cohesive adhesive, 75% adhesive left on test coupon, 25% adhesive left on film; or 100% adhesive transferred to test coupon).

Physical Properties
1. Tensile strength:
   a. ECTFE—8000 psi
   b. MFA—4000 psi
2. Elongation: >200% for both films.

Adhesive Strength at Temperature
   There were triplicate test coupons per test. Materials were brought up to temperature using a thermocouple. Once the samples were at temperature for 10 minutes, peel adhesion was performed (at the specified temperature). Adhesion strength was recorded in pounds per linear inch (PLI), the locus of failure, and how much adhesive was left behind on the panel was also listed. Note, unless noted the adhesive system was ADCHEM 747 acrylic pressure sensitive adhesive. 39-3 and 45-1 were acrylate copolymer pressure sensitive adhesives containing an amine corrosion inhibitor.

| Temperature | Sample | Peel PLI/Failure | Failure Mode | % Adhesive Remaining |
|---|---|---|---|---|
| | | Room Temperature Testing | | |
| Room Temperature | MFA clear 2 mil/4 mil adhesive | 9.4 pli (1 day) | Adhesive failure between appliqué and adhesive layer, adhesive left on substrate. Film tearing. | 95% of adhesive left on primed 2024 substrate |
| Room Temperature | ECTFE 3 mil gray and 2 mil adhesive | 14.8 pli (1 day) | Adhesive failure between appliqué and adhesive layer, adhesive left on substrate. Film tearing. | 95% adhesive left on primed 2024 substrate |
| Room Temperature | ECTFE 3 mil gray and 4 mils 39-3 adhesive | 8.4 pli (1 day) | Adhesive failure between the primed substrate and the adhesive | No adhesive left on primed 2024 substrate |
| Room Temperature | MFA clear 2 mil/4 mil adhesive (45-1) | 7.0 pli (1 day) 7.9 pli (4 day) 8.0 pli (7 day) | Adhesive failure between the primed substrate and the adhesive layer. No film tearing. | No adhesive left on primed 2024 substrate |

-continued

| | | | | |
|---|---|---|---|---|
| Room Temperature | MFA clear 2 mil/4 mil adhesive (39-3) | 8.2 pli (1 day) 7.3 pli (4 day) 6.8 pli (7 day) 9.3 pli (7 days 60° C.) | Adhesive failure between the primed substrate and the adhesive layer. No film tearing. | No adhesive left on primed 2024 substrate |

250° F. Testing

| Temperature | Sample | Peel PLI/Strength | Failure Mode | % Adhesive Left |
|---|---|---|---|---|
| 250° F. Temperature | MFA clear 2 mil/4 mil adhesive | 1.2 pli | Cohesive failure within the adhesive layer, adhesive on both substrate and appliqué, no film tear | 50% of adhesive left on primed 2024 substrate |
| 250° F. Temperature | ECTFE 3 mil gray and 2 mil adhesive | 1.9 pli | Cohesive failure within the adhesive layer, adhesive on both substrate and appliqué, no film tear | 50% of adhesive left on primed 2024 substrate |
| 250° F. Temperature | ECTFE 3 mil gray and 4 mils adhesive (39-3) | 1.4 pli | Cohesive failure within the adhesive layer, adhesive on both substrate and appliqué, no film tear | 50% of adhesive left on primed 2024 substrate |
| 250° F. Temperature | MFA clear 2 mil/4 mil adhesive (39-3) | 1.5 pli | Cohesive failure within the adhesive layer, adhesive on both substrate and appliqué, no film tear | 50% of adhesive left on primed 2024 substrate |
| 250° F. Temperature | MFA clear 2 mil/4 mil adhesive (45-1) | 5.0 pli | Adhesive failure between the primed substrate and the adhesive layer. No film tearing. | 30% of adhesive left on primed 2024 substrate |

| Temperature | Sample | Peel PLI/Failure | Failure Mode | % Adhesive Left |
|---|---|---|---|---|

350° F. Testing

| | | | | |
|---|---|---|---|---|
| 350° F. Temperature | MFA clear 2 mil/4 mil adhesive | 1.2 pli | Cohesive failure within the adhesive layer, adhesive on both substrate and appliqué, no film tear | 60% of adhesive left on primed 2024 substrate |
| 350° F. Temperature | ECTFE 3 mil gray and 2 mil adhesive | 1.1 pli | Cohesive failure within the adhesive layer, adhesive on both substrate and appliqué, no film tear | 60% of adhesive left on primed 2024 substrate |
| 350° F. Temperature | ECTFE 3 mil gray and 4 mils adhesive (39-3) | 0.7 pli | Cohesive failure within the adhesive layer, adhesive on both substrate and appliqué, no film tear | 60% of adhesive left on primed 2024 substrate |
| 350° F. Temperature | MFA clear 2 mil/4 mil adhesive (39-3) | 1.4 pli | Cohesive failure within the adhesive layer, adhesive on both substrate and appliqué, no film tear | 50% of adhesive left on primed 2024 substrate |

| | | | | |
|---|---|---|---|---|
| 350° F. Temperature | MFA clear 2 mil/4 mil adhesive (45-1) | 0.4 pli | Cohesive adhesive failure in the adhesive layer. No film tearing. | 50% of adhesive left on primed 2024 substrate |
| −65° F. Testing | | | | |
| −65° F. Temperature | MFA clear 2 mil/4 mil adhesive | 7.3 pli | Adhesive failure between the film and the adhesive layer, some film tearing. | 95% of adhesive left on primed 2024 substrate |
| −65° F. Temperature | ECTFE 3 mil gray and 2 mil adhesive | 13.5 pli | Adhesive failure between the film and the adhesive layer, no film tearing. | 95% of adhesive left on primed 2024 substrate |
| −65° F. Temperature | ECTFE 3 mil gray and 4 mil adhesive (39-3) | 7.0 pli | Adhesive failure between the film and the adhesive layer, no film tearing. | 95% of adhesive left on primed 2024 substrate |
| −65° F. Temperature | MFA clear 2 mil and 4 mils adhesive (39-3) | 3.9 pli | Adhesive failure between the film and the adhesive layer, some film tearing. | 95% of adhesive left on primed 2024 substrate |
| −65° F. Temperature | MFA clear 2 mil/4 mil adhesive (45-1) | 11.24 pli | Adhesive failure between the film and the adhesive layer, some film tearing. | 95% of adhesive left on primed 2024 substrate |

QUV Weatherometer Tests

Cycling as follows: exposure to UVA source for 17 minutes and exposure to 3 minutes water spray cycle at 60° C. Below are the peel results after the 30-day exposure.

| Temperature | Sample | Peel Failure | Failure Mode | % Adhesive Left |
|---|---|---|---|---|
| 60° C. QUV Weatherometer | MFA clear 2 mil/4 mil adhesive (45-1) | 5.5 pli (30 day) | Failure between adhesive and primed substrate, film tear after 2 inches of peel | No adhesive left on primed 2024 substrate |

Fluid Resistance

There were three triplicate test coupons per test. Test coupons were totally immersed in each fluid. Fluoropolymer films were then tested for adhesion strength after 7 days and then after 14 days. Adhesion strength in lbs per linear inch PLI was recorded with type of degradation and amount of adhesive was left behind on the test coupon.

| Fluid | Sample | Peel Failure | Failure Observations | % Adhesive Remaining |
|---|---|---|---|---|
| Hydraulic Fluid MIL-H-23699 | ECTFE 3 mil gray and 4 mils adhesive (39-3) | 5.3 pli (7 day CL) 4.7 pli (7 day immersion) 5.4 pli (14 day CL) | Adhesive failure between the adhesive and the primed substrate, film no degradation | No adhesive left on primed 2024 substrate |
| Hydraulic Fluid MIL-H-23699 | 2 mil MFA and 4 mils adhesive (39-3) | 4.2 pli (7 day CL) 4.5 pli (7 day immersion) 4.2 pli (14 day CL) | Adhesive failure between the adhesive and the primed substrate, film no degradation | No adhesive left on primed 2024 substrate |
| Hydraulic Fluid | MFA clear 2 | 5.9 pli (7 day CL) | Failure between | No adhesive left |

-continued

| | | | | |
|---|---|---|---|---|
| MIL-H-23699 | mil/4 mil adhesive (45-1) | 5.1 pli (7 day immersion) | the adhesive and the primed substrate, film no degradation | on primed 2024 substrate |
| Hydraulic Fluid MIL-H-23699 | ECTFE 3 mil gray and 2 mil adhesive | 12.8 pli (7 day CL) 13.3 pli (7 day immersion) 15.9 pli (14 day CL) | Failure cohesive in the adhesive, film no degradation | 70% of adhesive left on primed 2024 substrate |
| Hydraulic Fluid MIL-H-23699 | MFA clear 2 mil/4 mil adhesive | Film Broke adhesion higher than the cohesive strength of the | NA | NA |

| Fluid | Sample | Peel Failure | Failure Observations | % Adhesive Left |
|---|---|---|---|---|
| Engine Lube Oil MIL-I-7808 | ECTFE 3 mil gray and 4 mils adhesive (39-3) | 5.0 pli (7 day immersion) 5.4 pli (14 day CL) | Failure between the primed substrate and the adhesive, film no degradation | No adhesive left on primed 2024 substrate |
| Engine Lube Oil MIL-I-7808 | MFA clear 2 mil/4 mil adhesive (39-3) | 5.3 pli (7 day total immersion) 4.3 pli (14 day CL) | Failure between the primed substrate and the adhesive, film no degradation | No adhesive left on primed 2024 substrate |
| Engine Lube Oil MIL-I-7808 | MFA clear 2 mil/4 mil adhesive (45-1) | 7.0 pli (7 day CL) 4.1 pli (14 day CL) | Failure between the primed substrate and the adhesive, film no degradation | No adhesive left on primed 2024 substrate |
| Engine Lube Oil MIL-I-7808 | ECTFE 3 mil gray and 2 mil adhesive | 12.5 pli (7 day CL) 13.0 pli (7 day immersion) 15.9 pli (14 day CL) | Adhesive failure between the film and the adhesive layer, no film tearing. | 85% of adhesive left on primed 2024 substrate |
| Engine Lube Oil MIL-I-7808 | MFA clear 2 mil/4 mil adhesive | Film failed during pull, adhesion greater than cohesive strength | NA | NA |
| Synthetic Hydraulic Fluid MIL-H-83282 | ECTFE 3 mil gray and 4 mils adhesive (39-3) | 4.9 pli (7 day cheesecloth) 5.2 pli (7 day Immersed) 5.1 pli (14 day CL) | Failure between the primed substrate and the adhesive, film no degradation | No adhesive left on primed 2024 substrate |
| Synthetic Hydraulic Fluid MIL-H-83282 | MFA 2 mils/and 4 mils adhesive (39-3) | 3.5 pli (7 day CL) 3.2 pli (7 day immersion) 4.7 pli (14 day CL) | Failure between the primed substrate and the adhesive, film no degradation | No adhesive left on primed 2024 substrate |
| Synthetic Hydraulic Fluid MIL-H-83282 | ECTFE 3 mil gray and 2 mil adhesive | 12.5 pli (7 day CL) 13.0 pli (7 day immersion) 14.1 pli (14 day CL) | Failure between the adhesive and the film, film no degradation | 95% of adhesive left on primed 2024 substrate |
| Synthetic Hydraulic Fluid MIL-H-83282 | MFA clear 2 mil/4 mil adhesive | Film broke, adhesion greater than the cohesive strength of the | NA | NA |

| Fluid | Sample | Peel Failure | Failure Observations | % Adhesive Remaining |
|---|---|---|---|---|
| JP-8 jet fuel | ECTFE 3 mil gray and 4 mils adhesive (39-3) | 5.0 pli (7 day CL) 4.6 pli (7 day immersion) 3.5 pli (14 day CL) | Adhesive failure between the adhesive and the primed substrate, no film degradation | 10% of adhesive left on primed 2024 substrate |
| JP-8 jet fuel | MFA clear 2 mil/4 mil adhesive (39-3) | 3.6 pli (7 day CL) 4.2 pli (7 day immersion) 3.7 pli (14 day) | Cohesive failure in the adhesive, no film degradation | 70% of adhesive left on primed 2024 substrate |

-continued

| Fluid | Sample | Peel Failure | Failure Observations | % Adhesive left |
|---|---|---|---|---|
| JP-8 jet fuel | MFA clear 2 mil/4 mil adhesive (45-1) | 7.5 pli (7 day CL) 4.5 pli (14 day CL) | Adhesive failure between the adhesive and the primed substrate, no film degradation | 20% of adhesive left on primed 2024 substrate |
| JP-8 jet fuel | ECTFE 3 mil gray and 2 mil adhesive | 6.6 pli (7 days CL) 7.2 pli (7 day immersion) 5.0 pli (14 day) | Failure between the adhesive and the film, film no degradation | 90% of adhesive left on primed 2024 substrate |
| JP-8 jet fuel | MFA clear 2 mil/4 mil adhesive | Film broke during peel, adhesion greater than cohesive strength | NA | NA |

| Fluid | Sample | Peel Failure | Failure Observations | % Adhesive left |
|---|---|---|---|---|
| Cleaning Solvents MIL-C-38738 Type II | MFA clear 2 mil/4 mil adhesive (39-3) | 1.2 pli (7 day total immersion) 0.1 pli (14 day CL) | Failure between the film and the adhesive, film no degradation | 100% of adhesive left on primed 2024 substrate |
| Cleaning Solvents MIL-C-38738 Type II | MFA clear 2 mil/4 mil adhesive (45-1) | 0.7 pli (7 day total immersion) 0.1 pli (14 day CL) | Failure between the film and the adhesive, film no degradation | 100% of adhesive left on primed 2024 substrate |
| Deicing Fluid UCAR "50/50" SAE/ISO Type 1 | MFA clear 2 mil/4 mil adhesive (39-3) | 5.1 pli (7 day CL) 4.8 pli (14 day CL) | Failure between the adhesive and the substrate, film no degradation | 10% of adhesive left on primed 2024 substrate |
| Deicing Fluid UCAR "50/50" SAE/ISO Type 1 | MFA clear 2 mil/4 mil adhesive (45-1) | 5.8 pli (7 day CL) 5.1 pli (14 day CL) | Failure between the adhesive and appliqué, film no degradation | 50% of adhesive left on primed 2024 substrate |

| Fluid | Sample | Peel Failure | Failure Observations | % Adhesive Remaining |
|---|---|---|---|---|
| 5% Aqueous Cleaning Detergent | MFA clear 2 mil/4 mil adhesive (39-3) | 4.2 pli (7 day CL) 4.9 pli (14 day CL) | Failure between the adhesive and appliqué, film no degradation | 75% of adhesive left on primed 2024 substrate |
| 5% Aqueous Cleaning Detergent | MFA clear 2 mil/4 mil adhesive 45-1) | 5.6 pli (7 day) 5.5 pli (14 day CL) | Failure between the appliqué and adhesive, film no degradation | 80% of adhesive left on primed 2024 substrate |

EXAMPLE 7

Lightning Strike Protection Aircraft Appliqué

This invention also relates to removable, easy to repair or replace lightning strike protection appliqué system. The system provides for protecting both underlying electrically conductive and non-conductive materials and aircraft structures from damage typically encountered during an environmental lightning strike event. The protection method may be demonstrated by applying the preformed, flexible, single or multilayered oxyhalogenated polymeric appliqués of this invention, especially those comprising a metallic foil within the oxyhalogenated modified polymer/adhesive laminate system onto an aircraft skin, or component, or structure.

Further, this invention relates to lightweight, smooth, flexible appliqués or "wallpaper" lightning strike protection system which can be directly applied to any composite material structure with easy removal and repair properties. The appliqué systems as described herein are designed to include an all-in-one paintless coating system that provides:

1. Protection from lightning strike attachment and/or damage to underlying conductive or non-conductive composite materials;
2. Required surface aesthetics and aerodynamic features;
3. Easy one step application, and
4. Easy removal and repair/replacement Lightning Strike Testing and Evaluation The following 12 different appliqué materials were fabricated and tested at Lightning Technologies, Inc. (LTI), Pittsfield, Mass. The acrylic pressure sensitive adhesive used was ADCHEM™ 747. Black films were produced by adding about 1% conductive carbon black material to the fluoropolymer resin system during the extrusion of the PVDF (polyvinylidene fluoride) polymer. The copper and aluminum expanded foils (referred to as "mesh") were obtained from (AstroSeal, Products Mfg., Old Saybrook, Conn.), (Delker Corp., Branford, Conn.), or (EXMET Corp., Naugatuck, Conn.).

Fabrication

PART I—(4) Rolls 1. (1) roll black 3 Mil PVDF 25"×25' labeled LS-PV-03-02-CU4A-BLK consisted of:
   a. 2 Mil acrylic adhesive laminated to treated PVDF;
   b. Copper mesh (Exmet 1.5CU6-4/0) laminated to the 2 mil acrylic side of PVDF, and
   c. 4 Mil acrylic adhesive laminated over the metallic mesh.

2. (1) roll black 3 Mil PVDF 25"×25' labeled LS-PV-03-02-AL4A-BLK consisted of:

a. 2 Mil acrylic adhesive laminated to treated PVDF;
b. Aluminum mesh (Exmet 4AL8-4/1) laminated to the 2 mil acrylic side of PVDF, and
c. 4 Mil acrylic adhesive laminated over the metallic mesh.

3. (1) roll Natural (Clear) 3 Mil PVDF 25"×25' labeled LS-PV-03-02-CU4A-NAT consisted of:
   a. 2 Mil acrylic adhesive laminated to treated PVDF;
   b. Copper mesh (Exmet 1.5CU6-4/0) laminated to the 2 mil acrylic side of PVDF, and
   c. 4 Mil acrylic adhesive laminated over the metallic mesh.

4. (1) roll Natural (Clear) 3 Mil PVDF 25"×25' labeled LS-PV-03-02-AL4A-NAT consisted of:
   a. 2 Mil acrylic adhesive laminated to treated PVDF;
   b. Aluminum mesh (Exmet 4AL8-4/1) laminated to the 2 mil acrylic side of PVDF, and
   c. 4 Mil acrylic adhesive laminated over the metallic mesh.

PART II—(4) Rolls 1. (1) roll black 3 Mil PVDF 25"×25' labeled LS-PV-03-01-CU2A-BLK consisted of:
   a. 2 Mil acrylic adhesive laminated to treated PVDF;
   b. Copper mesh (Exmet 1.5CU6-4/0) laminated to the 2 mil acrylic adhesive side of PVDF, and
   c. 2 Mil acrylic adhesive laminated over the metallic mesh 2. (1) roll Black 3 Mil PVDF 25"×25' labeled LS-PV-03-01-AL2A-BLK consisted of:
   a. 2 Mil acrylic adhesive laminated to treated PVDF
   b. Aluminum mesh (Exmet 4AL8-4/1) laminated to the 2 mil acrylic side of PVDF, and
   c. 2 Mil acrylic adhesive laminated over the metallic mesh.

3. (1) roll Natural (Clear) 3 Mil PVDF 25"×25' labeled LS-PV-03-01-CU2A-NAT consisted of:
   a. 2 Mil acrylic adhesive laminated to treated PVDF;
   b. Copper mesh (Exmet 1.5CU6-4/0) laminated to the 2 mil acrylic adhesive side of PVDF, and
   c. 2 Mil acrylic laminated over the metallic Mesh 4. (1) roll Natural (Clear) 3 Mil PVDF 25"×25' labeled LS-PV-03-01-AL2A-NAT with:
   d. 2 Mil acrylic laminated to treated PVDF
   e. Aluminum mesh (Exmet 4AL8-4/1) laminated to the 2 mil acrylic side of PVDF, and
   c. 2 Mil Acrylic laminated over the metallic mesh.

PART III—(4) Rolls 1. (1) roll Black 3 Mil PVDF 25"×25' labeled LS-PV-03-03-CU2A-BLK consisted of:
   a. 4 Mil acrylic adhesive laminated to treated PVDF;
   b. Copper mesh (Exmet 1.5CU6-4/0) laminated to the 2 mil acrylic side of PVDF, and
   c. 2 Mil acrylic adhesive laminated over the metallic Mesh.

2. (1) roll black 3 Mil PVDF 25"×25' labeled LS-PV-03-03-AL2A-BLK consisted of:
   a. 4 Mil acrylic adhesive laminated to treated PVDF;
   b. Aluminum mesh (Exmet 4AL8-4/1) laminated to the 2 mil acrylic side of PVDF, and
   c. 2 Mil acrylic adhesive laminated over the metallic mesh.

3. (1) roll Natural (Clear) 3 Mil PVDF 25"×25' labeled LS-PV-03-03-CU2A-NAT consisted of:
   a. 4 Mil acrylic laminated to treated PVDF;
   b. Copper mesh (Exmet 1.5CU6-4/0) laminated to the 2 mil acrylic side of PVDF, and
   c. 2 Mil acrylic laminated over the metallic mesh.

4. (1) roll Natural (Clear) 3 Mil PVDF 25"×25' labeled LS-PV-03-03-AL2A-NAT consisted of
   a. 4 Mil Acrylic laminated to treated PVDF;
   b. Aluminum mesh (Exmet 4AL8-4/1) laminated to the 2 mil acrylic side of PVDF, and
   c. 2 Mil acrylic laminated over the metallic Mesh.

Pertinent thicknesses, weight and dielectric properties of the above appliqués are summarized below in Tables VII-I–XI.

TABLES VIII

| Material | Thickness (mils) | Weight (lbs. per Sq. Ft.) | Dielectric Strength (kV/mm) |
|---|---|---|---|
| PVDF | 3.0 | 0.0285 | 200–300 |
| Cu foil | ** | 0.029 | |
| Adhesive | 6.0 | 0.0345 | |
| Total | 9.0 | 0.0920 | |

TABLE IX

| Material | Thickness (mils) | Weight (lbs. per Sq. Ft.) | Dielectric Strength (kV/mm) |
|---|---|---|---|
| PVDF | 3.0 | 0.0285 | 200–300 |
| Cu foil | ** | 0.029 | |
| Adhesive | 4.0 | 0.0230 | |
| Total | 7.0 | 0.0805 | |

TABLE X

| Material | Thickness (mils) | Weight (lbs. per Sq. Ft.) | Dielectric Strength (kV/mm) |
|---|---|---|---|
| PVDF | 3.0 | 0.0285 | 200–300 |
| Al foil | ** | 0.015 | |
| Adhesive | 6.0 | 0.0345 | |
| Total | 9.0 | 0.0780 | |

TABLE XI

| Material | Thickness (mils) | Weight (lbs. per Sq. Ft.) | Dielectric Strength (kV/mm) |
|---|---|---|---|
| PVDF | 3.0 | 0.0285 | 200–300 |
| Al foil | ** | 0.015 | |
| Adhesive | 4.0 | 0.0230 | |
| Total | 7.0 | 0.0665 | |

Note:
** Cu and Al foils are 0.005 in thickness however they are encapsulated in the two adhesive layers and will impart no thickness to the coating system. All of the above appliqué materials were coated onto 2' × 2' composite panels. Details of the composite panels were:
Material: IM6/3501-6
Roll NO. 75
Thickness: 0.060"

TABLE XI-continued

| Material | Thickness (mils) | Weight (lbs. per Sq. Ft.) | Dielectric Strength (kV/mm) |
|---|---|---|---|

Orientation: $[(\pm 45)_2/0/90/(\pm 45)_2]^{10ply}$
Dimensions: 2' × 2'
Number of Bleeder Cloth: 2
Temp. @ Lay-up: 70° F.
Humidity @ Lay-up: 60%
C-Scan results: Good All appliqués were applied by hand and covered the entire panel.

The panels were subjected to the following high voltage and subsequent Zone 1A with B, C, and D Components. Specifically the conditions were as follows:

High Voltage Testing

These tests utilized a 0.5-meter gap at values ranging between 707 and 778 kVs. The rate of rise was approximately 1,000 kV per microsecond (plus or minus 50% per the spec.).

High Current Testing

Component A: The Peak Current ranged between 188 to 202 kA (spec 200 kA±10%). The Action Integral ranged from 1.7 top 2.4 million ampere-squared seconds (spec. 2.0 million±20%)

Component B: Coulombs ranged between 9.1 to 10.4 (spec. 10 coulombs±10%)

Component C: Coulombs ranged between 9 to 12 with a 300-Ampere average.

Component D: The Peak Current ranged from 98 to 102 kA (spec. 100 kA±10%). The Action Integral was 0.21 to 0.26 million ampere-squared seconds (spec. 0.25 million±20%)

Results of Testing

Listed above are 12 different appliqué materials that are derivatives of both black and clear PVDF having either copper or aluminum expanded foil and having different thicknesses and placement of acrylic adhesive. All of these appliqués are listed as Part I, II, or III with a subsequent label of #1–4 with a corresponding column that ranks the appliqués as Pass or Fail (with respect to the High Current Zone 1A tests—All films passed High Voltage and Zone 2A).

TABLE XII

| APPLIQUÉ | PASS OR FAIL |
|---|---|
| Part I #1 | Pass |
| Part I #2 | Pass |
| Part I #3 | Pass |
| Part I #4 | Pass |
| Part II #1 | Pass |
| Part II #2 | Pass |
| Part II #3 | Pass |
| Part II #4 | Pass |
| Part III #1 | Pass |
| Part III #2 | Pass |
| Part III #3 | Pass |
| Part III #4 | Pass |

All of the appliqués constructed using aluminum expanded foil passed the Zone 1A (plus B, C, and D Components) which are high current tests. The appliqués constructed using copper expanded foil Passed but afforded the best protection in cases where the adhesive layers were 2 mil thick. In general, lighter weight expanded foil coupled with the thinner adhesive systems were the best materials for protecting underlying composite panels. The worst cases were observed for the systems using the heavier copper mesh with the most adhesive. However, even in the worst cases the test appliqués passed standard lightning strike inspection.

EXAMPLE 8

The following results were tabulated using two different fluoropolymer films that were treated via the surface modification described in this disclosure in order to produce two oxyfluoropolymer materials. Specifically, a 5 mil thick ECTFE and 5 mil thick MFA fluoropolymers. purchased from Ausimont, USA, Thorofare NJ and then treated using the $H_2$/MeOH plasma method described hereinabove. Subsequently,these oxyfluoropolymer films were cold laminated with Adchem 747 acrylic adhesive via direct transfer from a silicone coated release liner as supplied by ADCHEM. These materials were then evaluated for their effectiveness for inhibiting corrosion on aircraft grade 2024-T aluminum both with and without the use of environmentally amine based corrosion inhibitors. Specifically, several corrosion inhibitors were supplied that were non-toxic, aqueous based coatings that were formulated so that they could also be used as an additive that could be directly incorporated into various adhesive systems.

Table XIII lists each corrosion inhibitor examined and the adhesion results based on a simple peel by hand test. Each panel was prepared by first making a 5% by volume solution of each corrosion inhibitor in distilled water. Next, each test panel was immersed for several minutes, removed from solution, and then dried with a hot air gun. Finally, we coated each panel with pressure sensitive adhesive backed oxyfluoropolymer film and let cure for 24 hrs. After curing, the oxyfluoropolymer film on each test panel was removed by hand and each corrosion inhibitor was then ranked based on the level of difficulty associated with removing the fluoropolymer film. The ranking was based on the ease of removal where the corrosion inhibitor coating that provided the best adhesion was ranked $1^{st}$ or best. The results are listed in Table XIII.

TABLE XIII

Fluoropolymer/Corrosion Inhibitor Adhesion Results

| Corrosion Inhibitor | Adhesion Results |
|---|---|
| *Cortec M-370A | Excellent |
| *Cortec M-5120 | Very Good |
| HoldTight ® 102 | Very Good |
| *Cortec M-377 | Fair |
| *Cortec VCI-377 | Failed* |

*Proprietary products of Cortec Corp., St. Paul, MN
Based on the results listed in Table XIII Cortec M-370A and Cortec M-5120 were selected for the final tests.

Preparation of Aluminum Test Panels

3"×5" aluminum test panels were supplied by the Naval Air Warfare Center-Aircraft Division (NAWCAD) at Patuxent River Md. One-half of the test panels were pretreated at NAWCAD by deoxygenating and priming with chromate containing compound. The other half of the test panels were sent from NAWCAD "as received" with no prior treatment. The primed test panels were then coated "as received" with the various corrosion inhibitors and oxyfluoropolymer appliqué films whereas the aluminum test panels that were delivered with no prior treatment were first degreased by ultrasonically cleaning each panel in MeOH.

Preparation of corrosion inhibitor coatings solutions and Application to aluminum test panels:

Both the Cortec M-370 A and the M-5120 were diluted into distilled water in order to make a 5% by volume corrosion inhibitor solution.

Once the solutions were made the aluminum test panels were coated as follows. Panels were coated with both M-370

A and M-5120 by directly immersing each panel into each respective corrosion inhibitor solution for approximately 3–5 minutes. The panels were then removed and allowed to dry in air for ca. 5 minutes and were then dried using a hot air gun.

The oxyfluoropolymer appliqué films were applied to each panel by simply removing the paper release coating and laminating by hand the appliqué film directly onto each respective aluminum test panel. The appliqué films were applied to both sides of each aluminum panel and approximately ⅛ inch was left overhanging so that the edges could be sealed thus encapsulating the entire test panel in the oxyfluoropolymer coating. A duplicate series of five test panels were fabricated for each permutation of aluminum test panel, corrosion inhibitor and oxyfluoropolymer film. Three test panels out of each lot of five were sent to NAWCAD for evaluation and corrosion tests. The other two panels were sent to an Independent testing laboratory where peel adhesion tests will be performed in order to evaluate the adhesion strength of the oxyfluoropolymer films to the coated and uncoated aluminum.

TABLE XIV (Reference #'s for fluoropolymer film and corrosion inhibitor combinations)

| Corrosion inhibitor | MFA fluoropolymer | ECTFE fluoropolymer |
|---|---|---|
| Reference w/o inhibitor | X | Y |
| Cor-Tec VCI M 370-A | 3 | 7 |
| Cor-Tec VCI M 5120 | 4 | 8 |

TABLE XV (Reference #'s for each test panel)

| Sample Reference # (see Table 1) | Al test panel w/chromate pre-treatment (A) | Al test panel w/o chromate pre-treatment (B) |
|---|---|---|
| X | XA | XB |
| Y | YA | YB |
| 3 | 3A | 3B |
| 4 | 4A | 4B |
| 7 | 7A | 7B |
| 8 | 8A | 8B |

Legend for Tables
XA 5 mil MFA fluoropolymer with 4 mil acrylic adhesive PSA on deoxidized, chromate pretreated aluminum test panel
YA 5 mil ECTFE fluoropolymer with 4 mil acrylic adhesive PSA on deoxidized, chromate pretreated aluminum test panel
3A 5 mil MFA fluoropolymer with 4 mil acrylic adhesive PSA on deoxidized, chromate pretreated aluminum test panel that was additionally treated with Cor-tec VCI M 370-A
4A 5 mil MFA fluoropolymer with 4 mil acrylic adhesive PSA on deoxidized, chromate pretreated aluminum test panel that was additionally treated with Cor-tec VCI M 5120
7A 5 mil ECTFE fluoropolymer with 4 mil acrylic adhesive PSA on deoxidized, chromate pretreated aluminum test panel that was additionally treated with Cor-tec VCI M 370-A
8A 5 mil ECTFE fluoropolymer with 4 mil acrylic adhesive PSA on deoxidized, chromate pretreated aluminum test panel that was additionally treated with Cor-tec VCI M 5120
XB 5 mil MFA fluoropolymer with 4 mil acrylic adhesive PSA on aluminum test panel without any prior pre-treatment or chromate protection
YB 5 mil ECTFE fluoropolymer with 4 mil acrylic adhesive PSA on aluminum test panel without any prior pre-treatment or chromate protection
3B 5 mil MFA fluoropolymer with 4 mil acrylic adhesive PSA on aluminum test panel that was only treated with Cor-tec VCI M 370-A
4B 5 mil MFA fluoropolymer with 4 mil acrylic adhesive PSA on aluminum test panel that was only additionally treated with Cor-tec VCI M 5120

TABLE XV-continued (Reference #'s for each test panel)

| Sample Reference # (see Table 1) | Al test panel w/chromate pre-treatment (A) | Al test panel w/o chromate pre-treatment (B) |
|---|---|---|

7B 5 mil ECTFE fluoropolymer with 4 mil acrylic adhesive PSA on aluminum test panel that was only treated with Cor-tec VCI M 370-A
8B 5 mil ECTFE fluoropolymer with 4 mil acrylic adhesive PSA on aluminum test panel that was only treated with Cor-tec VCI M 5120

Tables XVI and XVII below provide data on: corrosion and adhesion testing of coatings on deoxidized, and chromate pre-treated aluminum test panels, and corrosion and adhesion testing of coatings on "As received", Untreated, aluminum test panels, respectively. Tables XVI and XVII list: (1) the test panel and coating, (2) the results of 2000 hrs of Salt Spray exposure as per ASTM B-117, (3) the results of 500 hrs of $SO_2$ salt spray exposure as per ASTM G 85, and (4) the peel strength values for each test panel and applied coatings system.

TABLE XVI

Corrosion Results

| Test | 2000 hrs Salt | 500 hrs $SO_2$ | Adhesion Results | ±Error:% |
|---|---|---|---|---|
| XA | No Corrosion | No Corrosion | 14.2 = (2550 N/m) | 0.43:3.0% |
| YA | No Corrosion | No Corrosion | 32.4 = (5680 N/m) | 1.40:4.3% |
| 3A | No Corrosion | No Corrosion | 21.6 = (3791 N/m) | 1.10:5.1% |
| 4A | No Corrosion | No Corrosion | 14.2 = (2550 N/m) | 0.92:6.5% |
| 7A | Slight Corr. in Scribe | Corr. in Scribe | 31.2 = (5460 N/m) | 1.99:6.4% |
| 8A | No Corrosion | Slight Corr. in Scribe | 31.8 = (5580 N/m) | 2.80:8.8% |

TABLE XVII

Corrosion Results

| Test | 2000 hrs Salt | 500 hrs $SO_2$ | Adhesion Results | ±Error:% |
|---|---|---|---|---|
| XB | Slight Corr. in Scribe | Slight Corr. in Scribe | 13.5 = (2355 N/m) | 1.11:8.2% |
| YB | Slight Corr. in Scribe | Corr. in Scribe | 31.7 = (5554 N/m) | 2.41:7.6% |
| 3B | No Corrosion | No Corrosion | >18.4 = (3217 N/m) | 6.00:32.6% |
| 4B | Slight Corr. in Scribe | Slight Corr. in Scribe | 13.0 = (2275 N/m) | 0.52:4.0% |
| 7B | Medium Corr. in Scribe | Corr. in Scribe | 31.5 = (5514 N/m) | 0.86:2.7% |
| 8B | Slight Corr. in Scribe | Medium Corr. in Scribe | 19.4 = (3395 N/m) | 1.11:5.7% |

Results of Salt Spray Corrosion Tests

Table XVI

Corrosion results of all coatings tested on the aluminum panels that were first deoxidized and pre-treated with chromate (as per standard pre-treatments for aluminum aircraft) all passed both the 2000 hr neutral salt spray and the following 500 hr $SO_2$ salt spray tests. In fact, Table XVI shows a series of coatings which demonstrate no corrosion whatsoever—even in the scribed areas.

Generally, all oxyfluoropolymer appliqué coating systems applied and evaluated in these studies passed the rigorous testing methods standardized for coatings systems on aircraft grade aluminum. We found both the MFA and ECTFE oxyfluoropolymer appliqués (having no additional corrosion inhibitor added to the coating system) corrosion-free on all portions of the aluminum test panels, including scribed areas. This demonstrates that use of the oxyfluoropolymer appliqués, as paint replacement alternatives on pretreated aluminum are viable, and that the materials (based on the $SO_2$ studies) actually afford better long term protection against extremely harsh, corrosive conditions than currently used paints and other coating systems.

Table XVII

Table XVII reports results from test panels labeled "B". These aluminum test panels were identical to the test panels used in Table XVI (i.e. those labeled with and "A") except for the fact that they were provided from NAWCAD without any prior treatment or cleaning.

The results listed in Table XVII demonstrate that without the deoxidation step and chromate pre-treatment used for the test samples in Table XVI, the onset of corrosion results for almost all of the samples. Although corrosion was observed on all samples except 3B, the degree of corrosion was only minor and based on the test criteria (i.e., pass/fail) for ASTM B-117 and G 85, all of the coating systems on the test panels listed in Table XVII are still considered passes. The coating system used for test panel 3B was an MFA oxyfluoropolymer appliqué applied to an "as received" aircraft grade aluminum test panel that was first degreased by ultrasonicating in a mild alcohol solution, and then coated with an aqueous based corrosion inhibitor obtained from Cortec's line of vapor corrosion inhibitors: VCI M 370-A.

Based on these results and adhesion results that will be discussed later, the oxyfluoropolymer appliqué/VCI M 370-A coating system appears to be the best.

Adhesion Tests

Tables XVI and XVII list the adhesion test results obtained by Advanced Plastic and Material Testing, Inc. APMT is accredited by the American Association for Laboratory Accreditation. The peel adhesion tests were performed as per ASTM D 903-93 and were performed as follows. Two replicate aluminum panels for each test panel were prepared identically to those prepared for the corrosion tests described above except that the oxyfluoropolymer films were not applied to the test panels as an encapsulating coating. The oxyfluoropolymer appliqués were applied as 25×100 mm strips that were coated onto each respective test panel by vigorously applying thumb pressure and then letting the oxyfluoropolymer appliqué strips cure for approximately 7 days. A total of four test strips per each panel were applied and peel adhesion strengths were measured by an 180° peel with a crosshead speed of 305 mm/min as per ASTM D 903-93.

The peel adhesion results are listed in Tables XVI and XVII with the calculated percent error that is used to show the variability in surface adhesion for each test panel preparation (i.e., the variability indicates the degree of homogeneity and effective coverage of the surface preparation). In general, each coating system had (within error limits) the same results whether they were measured on deoxidized, chromate pre-treated aluminum (Table XVI) or the "as received" aluminum test panels (Table XVII). This indicates that the standard deoxidation step and subsequent chromate pre-treatment used on current aluminum based aircraft has no effect on the adhesion. This is supported by the fact that the oxyfluoropolymer appliqués applied to test panels XA and YA have similar adhesion strengths, as the oxyfluoropolymer appliqués applied to panels XB and YB. The major difference is the base oxyfluoropolymer where the measurements show that the MFA appliqué bonds with strengths between 13 and 14 PLI, as opposed to the ECTFE appliqué which bonds significantly stronger with peel strengths exceeding 30 PLI. Since the adhesive used for both the MFA and ECTFE oxyfluoropolymer is the same (ADChem acrylic adhesive 747), the difference in peel strengths is appears related to the difference in stiffness or surface modulus exhibited by each respective oxyfluoropolymer, (ECTFE has a higher surface modulus than MFA which is more flexible and elongates easier). In any case, 13 PLI is an excellent value suitable for providing the required adhesion for the intended peel and stick application (i.e., an appliqué coating for aircraft); whereas the 30 PLI measured for the ECTFE material is exceptionally high making it better suited for coating systems requiring long term corrosion protection that will not require multiple removals for changing color schemes or adding other characteristics like signature reduction or $E^3$ protection (e.g., lightning strike protection).

Conclusions

Based on both the corrosion and adhesion test data presented above it appears that all oxyfluoropolymer appliqué coating systems are effective for corrosion protection. Specifically, for use on deoxidized and chromate pre-treated aluminum, the oxyfluoropolymer appliqués (i.e., MFA and ECTFE) demonstrate outstanding corrosion protection both with and without the use of corrosion inhibitors. In the case where the aluminum is not pre-treated, the most effective coatings system appears to be the MFA oxyfluoropolymer appliqué used in conjunction with Cortec's VCI M 370-A corrosion inhibitor, which demonstrated 100% effectiveness with respect to preventing corrosion under the salt spray test conditions evaluated. Additionally, the Cortec's M 370-A also shows good compatibility to MFA films backed with our acrylic PSA in that the adhesion strengths measured are expected to be more than sufficient for providing adhesion to aircraft grade aluminum metal.

The text results demonstrate the effectiveness of one or more of these oxyfluoropolymer appliqué coatings systems for protecting both pretreated aircraft grade aluminum, as well as aluminum that were coated without any prior pretreatment.

EXAMPLE XI

Infrared Welding of Appliqués

In many instances, it is desirable to have a halopolymer protective lining system which is seam-free. For example, linings used to protect metal, or plastic vessels from chemical attack in total immersion applications cannot have seams or voids that will allow chemicals to undercut the lining which subsequently leads to attack of the underlying material used in fabricating the vessel.

Accordingly, halopolymers are often the material of choice as lining materials for severe chemical environments due to their stability to both temperature, and almost all solvents and chemicals. These lining systems, however, must be seam-free. Conventionally, thick sheets (i.e., greater than 30 mils in thickness) of halopolymer are commonly seam welded via hot air. However, thinner films (i.e., 30 mils or less) are more difficult to weld, and not commonly utilized due to: 1.) the inability to apply them via an adhesive that will bond the halopolymer to an underlying metal or plastic material that is used in the chemical tank construction, and 2) the inability to apply hot air to thin halopolymer films without creating voids or defects within the film itself. In order to overcome the inherent difficulty in welding thin halopolymer films, alternative methods to hot air welding would have to be employed (e.g., infrared and microwave welding) that have been developed for other plastic or polymeric materials (see U.S. Pat. Nos. 5,814,175 and 5,843,265). However, the drawback to these techniques relate to the requirement of additives to the polymer system that can absorb radiation (i.e., infrared or microwave radiation), and subsequently release heat that is capable of melting the polymer from within the bulk. Additives for infrared welding include carbon black and other black body absorbers, and additives useful for microwave welding include any electrically conductive material including carbon, metallic or conducting polymeric particulates, e.g., fibers, or whiskers.

As a further aspect of this invention, weldable oxyhalopolymer films containing carbon black were fabricated as follows: 100 lbs of ECTFE (Halar® of Ausimont USA) were purchased from Ausimont USA, Thorofare N.J., USA. Two (2) 50 lb lots of the solid ECTFE (Halar) resin were then compounded with carbon black from LNP Corp. Exton, Pa., USA in order to provide two (2) 50 lbs lots of 0.1% carbon black in ECTFE and 1.0% carbon black in ECTFE. The two lots of resin were then extruded into 3-mil thick film by RandCastle Extrusion Systems, Cedar Grove, N.J., USA.

These films were then placed over a seam (butt joint) created by applying two 5 mil sheets of ECTFE material as a coating appliqué over a stainless steel panel. The 5 mil ECTFE sheets were treated only on one side (i.e., the oxyfluoropolymer was created on only one side of the ECTFE appliqué) which was subsequently reacted to a 4 mil thick acrylic pressures sensitive adhesive (ADCHEM 747) that was used to bond the ECTFE appliqué to the underlying stainless steel plate. Both the 0.1% and 1.0% carbon black containing ECTFE materials were then successfully heat welded using a infrared spot heater obtained from Research Incorporated, Eden Prarie, USA. A 250 watt variable output bulb was used to heat melt the carbon filled ECTFE directly to the 5 mil non-carbon filled ECTFE appliqué thus creating a seamless coating over the stainless steel. Spark testing at 10,000 volts indicated no defects in the welded appliqué system.

We claim:

1. An appliqué comprising an oxyhalopolymer-adhesive composite wherein the adhesive layer of said composite is chemically bonded to reactive sites of said oxyhalopolymer on at least one side of the oxyhalopolymer layer.

2. The appliqué of claim 1 wherein the reactive sites on the at least one side of the oxyhalopolymer layer of said composite comprise from 1 to 100 percent of surface halogen atoms of a starting halopolymer permanently substituted with hydrogen and oxygen or oxygen-containing groups of which from about 3 to about 30 percent of the substituted halogens are replaced with oxygen or oxygen-containing groups and from about 70 to about 97 percent of the substituted halogens are substituted with hydrogen atoms.

3. The appliqué of claim 1 wherein the reactive sites on the at least one side of the oxyhalopolymer of said composite have from about 20 to about 85 percent of surface halogens of a starting halopolymer permanently substituted with hydrogen and oxygen or oxygen-containing groups.

4. The appliqué of claim 2 wherein said starting halopolymer comprises fluorine, or fluorine in combination with at least one other halogen.

5. The appliqué of claim 1 wherein the oxyhalopolymer layer of said composite is an oxyfluoropolymer or oxychlorofluoropolymer.

6. The appliqué of claim 1 wherein the adhesive layer of said oxyhalopolymer-adhesive composite comprises a member selected from the group consisting of alkyd, epoxy, epoxy-acrylate, polyurethane, phenolic, urea based, aqueous based adhesive, solvent based adhesive, acrylics, fluorine based adhesives, polyester, heat sealable polymers, polyether based adhesives, pressure sensitive rubber adhesive, pressure sensitive acrylic adhesive, vinyl-acrylic, vinyl acetate, silicon based adhesives, pressure sensitive silicone, release coatings, acetates, vinyl, and copolymers, terpolymers and blends thereof.

7. The appliqué of claim 2 wherein said starting halopolymer is a member selected from the group consisting of FEP, PTFE, ePTFE, MFA, PFA, ECTFE, PCTFE, PVDF, ETFE and copolymers, terpolymers and blends thereof.

8. The appliqué of claim 2 wherein said starting halopolymer is a terpolymer of tetrafluoroethylene, hexafluoropropylene and vinylidene fluoride.

9. The appliqué of claim 1 wherein the oxyhalopolymer layer comprises first and second sides wherein both of said sides have halogen atoms of a starting halopolymer permanently substituted with hydrogen and oxygen or oxygen-containing groups.

10. The appliqué of claim 1 wherein the adhesive layer of said oxyhalopolymer-adhesive composite comprises at least one member selected from the group consisting of corrosion inhibitor, pigment, dye, filler, flow control agent, dispersant, thixotropic agent, flame retardant, smoke retardant, adhesion promotor, antioxidant, UV stabilizer, light stabilizer and curing catalyst.

11. The appliqué of claim 1 wherein at least one layer of the oxyhalopolymer-adhesive composite is electrically conductive.

12. The appliqué of claim 11 wherein the electrically conductive layer(s) of said composite comprise at least one conductive additive selected from the group consisting of metallic powder, metallic fibers, metallic flakes, carbon black, carbon fibers and an intrinsically conductive polymeric powder.

13. The appliqué of claim 1 wherein the adhesive layer of said oxyhalopolymer-adhesive composite comprises at least one material selected from the group consisting of vibration dampening agent, acoustic dampening agent, impact absorber, deformation attenuator, abrasion protectant, optical shielding material, radiation shielding material and electronic shielding material.

14. The appliqué of claim 1 wherein the adhesive layer of said oxyhalopolymer-adhesive composite comprises at least one attenuator or shielding material selected from the group consisting of vulcanized rubber-based adhesive, vulcanized olefinic adhesive, high specific gravity filler, bitumen additive, micro form filler, composite filler, metal particulates and ceramic particles.

15. The appliqué of claim 1 wherein the adhesive layer of said composite comprises one or more layers of adhesive suitable for encapsulating at least one material or device selected from the group consisting of a polymeric material, inorganic material, conductor, semi-conductor and a metallic film.

16. The appliqué of claim 15 wherein the encapsulated device or material is at least one member selected from the group consisting of radio frequency sensitive antennae, microwave sensitive communications antennae, fiber optic network, electrodes for electrical and/or chemical transduction of signals, electrically conductive protective film, foil, mesh or screen, deformable polymeric or gel spheres, polymeric and/or metallic micro-honeycombed and 3-dimensional deformable structures for shock and impact attenuation, micro capillary or tubular ducts and temperature controlling pipes.

17. The appliqué of claim 1 comprising a fiber optic network.

18. The appliqué of claim 1 further comprising an electronic layer affixed to the adhesive layer of said oxyhalopolymer-adhesive composite.

19. The appliqué of claim 18 wherein said electronic layer is comprised of a substrate suitable for protecting electronic devices disposed therein and for signal processing.

20. The appliqué of claim 19 wherein said substrate of the electronic layer comprises one or more layers of an adhesive possessing properties selected from the group consisting of electrically non-conductive, electrically conductive and thermally conductive.

21. The appliqué of claim 20 wherein said electronic layer comprises a transmit/receive module.

22. The appliqué of claim 21 wherein said transmit/receive module of said electronic layer is suitable for processing microwave signals or for planar active apertures.

23. The appliqué of claim 1, including means for heating and/or cooling said appliqué.

24. The appliqué of claim 23 wherein said means for heating and/or cooling said appliqué comprises a thermal management system of at least one of micro channels or tubes, nano tubes, polymeric or viscoelastic tubing, metallic duct networks, or conductive wires embedded in at least one layer of said appliqué.

25. The appliqué of claim 18, wherein said electronic layer further comprises means for heating or cooling said layer.

26. The appliqué of claim 18, including a further adhesive layer engaged with said electronic layer.

27. The appliqué of claim 26, wherein at least one of the adhesive layers further comprises a thermoelectric device for enhancing cooling efficiency of the appliqué.

28. The appliqué of claim 27, wherein said thermoelectric device comprises first and second thermoelements, said first thermoelement comprising a superlattice of p-type thermoelectric material, and said second thermoelement comprising a superlattice of n-type thermoelectric material.

29. The appliqué of claim 28, wherein said first and second thermoelements are electrically coupled to one another.

30. The appliqué of claim 26, wherein at least one of the adhesive layers of the composite further comprises at least one miniature sensor device.

31. The appliqué of claim 30, wherein said at least one miniature sensor device is a micro electromechanical system (MEMS).

32. The appliqué of claim 31, wherein said at least one of said MEMS is for monitoring at least one environmental condition selected from the group consisting of surface pressure, optical, electrical, thermal and chemical.

33. The appliqué of claim 31, wherein said MEMS is equipped with at least one RF transmitter.

34. The appliqué of claim 1, wherein said oxyhalopolymer layer of said composite further comprises at least one additive suitable for modifying at least one property selected from the group consisting of optical, magnetic, thermal, antistatic, electrical, and chemical.

35. The appliqué of claim 1, wherein said oxyhalopolymer layer of said composite comprises pigments, dyes, pigmented conductive particles, conductive polymers, amorphous carbon particles, graphitic carbon particles, metallic particles, inorganic salts, non-metallic oxides, metallic oxides, toner, mica, glass particles and sublimed dyes to form a pattern, design or picture.

36. The appliqué of claim 1, wherein said oxyhalopolymer layer of said composite further comprises at least one of means for corrosion control, electronic sensors, radar devices, thermal emissions and means for managing optical emissions.

37. The appliqué of claim 1, wherein the surface of said oxyhalopolymer layer in contact with said adhesive layer is modified to increase the surface area in contact with said adhesive layer.

38. The appliqué of claim 1, wherein at least one surface of said oxyhalopolymer layer is modified sufficiently to alter the optical properties of said composite.

39. The appliqué of claim 1, wherein the exterior surface of said oxyhalopolymer layer is sufficiently modified to minimize resistance to air or water drag.

40. The appliqué of claim 1, wherein the exterior surface of said oxyhalopolymer layer comprises riblets of suitable design for reducing frictional drag from fluids.

41. The appliqué of claim 9, including a further layer bonded to the exterior surface of said oxyfluoropolymer layer of said composite, said further layer being suitable for modifying at least one of the properties of said appliqué selected from the group consisting of optical resistance, abrasion resistance, thermal resistance, electrical conductivity, architectural design and resistance to graffiti.

42. The appliqué of claim 41, wherein the further layer applied to the exterior surface of said oxyfluoropolymer layer comprises at least one material selected from the group consisting of infrared reflective, transparent or conductive coating; controllable optical and thermally reflective coating; radio frequency reflective, transparent or conductive coating; scratch resistant coating; layer for bonding adhesive, a metal, an inorganic material, a film comprising semi-conductors and polymers.

43. The appliqué of claim 1 wherein oxyfluoropolymer-adhesive composite further comprises at least one metal or alloy thereof.

44. The appliqué of claim 1 wherein at least one surface of the appliqué selected from the group consisting of the adhesive layer and the oxyfluoropolymer layer comprises a metal or metal alloy.

45. The appliqué of claim 43 wherein the oxyfluoropolymer layer comprises at least one member selected from the group consisting of particulate metal, metallic film, metallic foil, metallic mesh or electronic circuitry.

46. The appliqué of claim 43 wherein an adhesive layer of the oxyfluoropolymer-adhesive composite comprises at least one member selected from the group consisting of particulate metal, metallic film, metallic foil, metallic mesh and electronic circuitry and fiber optics network.

47. The appliqué of claim 43 which is protective from electromagnetic environmental effects.

48. The appliqué of claim 44 which is protective from electromagnetic environmental effects.

49. The appliqué of claim 45 which is protective from electromagnetic environmental effects.

50. The appliqué of claim 46 which is protective from electromagnetic environmental effects.

51. An aerospace, land or marine vehicle or device with the protective appliqué of claim 47 applied thereto.

52. An aerospace, land or marine vehicle or device with the protective appliqué of claim 48 applied thereto.

53. An aerospace, land or marine vehicle or device with the protective appliqué of claim 49 applied thereto.

54. An aerospace, land or marine vehicle or device with the protective appliqué of claim 50 applied thereto.

55. An aerospace, land or marine vehicle or device with the appliqué of claim 41 for controlling optical and thermal reflectivity.

56. A seamless protective liner for a vessel comprising the appliqué of claim 1 with a thermally and/or electrically conductive additive.

57. The seamless protective liner of claim 56 wherein the thermally and/or electrically conductive additive is a member selected from the group consisting of particulates of carbon, metal and mixtures thereof.

58. The appliqué of claim 1 including perforations in at least the oxyfluoropolymer layer of the composite.

* * * * *